US008866799B2

(12) United States Patent
Jun et al.

(10) Patent No.: US 8,866,799 B2
(45) Date of Patent: Oct. 21, 2014

(54) METHOD OF DRIVING DISPLAY PANEL AND DISPLAY APPARATUS FOR PERFORMING THE SAME

(75) Inventors: Bong-Ju Jun, Chungeheongnam-do (KR); Nam-Gon Choi, Chungeheongnam-do (KR); Joo-Hwan Park, Gyeonggi-do (KR); Yong-Bum Kim, Gyeonggi-do (KR); Dong-Hyun Yeo, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 1015 days.

(21) Appl. No.: 12/938,302

(22) Filed: Nov. 2, 2010

(65) Prior Publication Data

US 2011/0187730 A1 Aug. 4, 2011

(30) Foreign Application Priority Data

Feb. 3, 2010 (KR) ........................ 10-2010-0010049

(51) Int. Cl.
*G09G 5/00* (2006.01)
*G06T 1/60* (2006.01)
*G09G 5/36* (2006.01)
*G09G 3/36* (2006.01)

(52) U.S. Cl.
CPC .. *G09G 3/36* (2013.01); *G09G 5/36* (2013.01); *G09G 5/00* (2013.01)
USPC ............................ 345/204; 345/530; 345/649

(58) Field of Classification Search
CPC .................. G09G 2310/0283; G09G 2340/16; G09G 3/3674; G09G 2340/0492
USPC .......... 345/204, 530, 531, 533, 534, 545, 649
See application file for complete search history.

(56) References Cited

U.S. PATENT DOCUMENTS

| | | | | |
|---|---|---|---|---|
| 6,226,016 | B1 | 5/2001 | Chee et al. | |
| 6,442,201 | B2 * | 8/2002 | Choi | 375/240.12 |
| 7,499,056 | B2 | 3/2009 | Fukuda et al. | |
| 7,522,142 | B2 * | 4/2009 | Song | 345/98 |
| 7,535,474 | B1 | 5/2009 | Scholander et al. | |
| 7,589,745 | B2 | 9/2009 | Inoue et al. | |
| 7,692,620 | B2 * | 4/2010 | Horibata et al. | 345/100 |

(Continued)

FOREIGN PATENT DOCUMENTS

| | | |
|---|---|---|
| JP | 06-012025 | 1/1994 |
| JP | 10-207435 | 8/1998 |

(Continued)

*Primary Examiner* — Joni Richer
(74) *Attorney, Agent, or Firm* — Innovation Counsel LLP

(57) ABSTRACT

A display apparatus includes a display panel, a plurality of gate lines driving circuit parts, a plurality of data lines driving circuit parts and a timing control part. The display panel includes a plurality of gate lines and a plurality of data lines. The gate lines driving circuit parts output gate signals to the gate lines. The data lines driving circuit parts output data signals to the data lines. The timing control part applies a dummy gate signal to at least one dummy gate line, controls a latch sequence of image data and an output sequence of the gate lines driving circuit parts in a reverse sequence, in response to an inverted-mounting mode selection signal for displaying an inverted mount image to the display panel. Because signal lines can be shortened, heat generated by the display apparatus may be decreased and image quality of the display apparatus may be improved.

11 Claims, 29 Drawing Sheets

(56) References Cited

U.S. PATENT DOCUMENTS

| | | | | |
|---|---|---|---|---|
| 8,269,704 | B2 * | 9/2012 | Jung et al. | 345/87 |
| 2006/0098879 | A1 * | 5/2006 | Kim et al. | 382/233 |
| 2009/0021466 | A1 * | 1/2009 | Otose et al. | 345/100 |
| 2009/0073193 | A1 | 3/2009 | Nagaraj et al. | |
| 2009/0096813 | A1 | 4/2009 | Nagaraj et al. | |

FOREIGN PATENT DOCUMENTS

| | | | |
|---|---|---|---|
| JP | 10-240199 | | 9/1998 |
| JP | 2005-004120 | | 1/2005 |
| JP | 2005-223426 | | 8/2005 |
| JP | 2005-346044 | | 12/2005 |
| JP | 2006-003892 | | 1/2006 |
| JP | 2006-154715 | | 6/2006 |
| JP | 2007-272180 | | 10/2007 |
| JP | 2008-216993 | | 9/2008 |
| KR | 1020000023136 | A | 4/2000 |
| KR | 1020040111016 | A | 12/2004 |
| KR | 1020060025339 | A | 3/2006 |
| KR | 1020060045934 | A | 5/2006 |
| KR | 1020060058408 | A | 5/2006 |
| KR | 1020070037793 | A | 4/2007 |
| KR | 1020070042242 | A | 4/2007 |
| KR | 1020070098418 | A | 10/2007 |
| KR | 1020080060099 | A | 7/2008 |

* cited by examiner (RECENT ART)

580

| |
|---|
| [7]O/E pixel swap |
| [6]O/E line swap |
| [5]RGB swap |
| [4]D-IC order swap |
| [3]Data order swap |
| [2]AiPi Lane swap |
| [1]Pol swap |
| [0]A/B Gamma swap |

METHOD OF DRIVING DISPLAY PANEL AND DISPLAY APPARATUS FOR PERFORMING THE SAME

PRIORITY STATEMENT

This application claims priority under 35 U.S.C. §119 to Korean Patent Application No. 10-2010-0010049, filed on Feb. 3, 2010 in the Korean Intellectual Property Office (KIPO), the contents of which application are herein incorporated by reference in their entirety.

BACKGROUND

1. Field of Disclosure

The present disclosure of invention relates to a method of driving a display panel and to a display apparatus performing the method. More particularly, the present disclosure relates to a method of driving a display panel while reducing heat generated by the display apparatus and while improving image quality, and to a display apparatus performing the method.

2. Description of Related Technology

In general, a typical liquid crystal display (LCD) apparatus (whose display panel is mounted in a here-called, "normal" mounting mode) is driven via a from-the-top driving method. In the from-the-top driving method, a gate lines driving part is typically disposed at a left side of a frontally faced LCD panel displaying a normal-mount image which is not reversed (and which normal-mount image has its pixels typically refreshed hierarchically, first in left to right fashion per row, and then top to bottom, row by row), and a data lines driving part and a timing control part transferring a signal to the gate lines driving part, where the data lines driving part is disposed at a top side of the LCD panel.

In the from-the-top driving method, the data lines driving part sequentially latches data signals to data line driving circuits in a left to right order, and the gate lines driving part sequentially transfers gate signals to gate lines in a top side of the LCD panel to a lower side of the LCD panel order. (In other words, the conventional normal image frame refreshing method is hierarchically provided, first as left to right per row refreshing, and then top row to bottom row refreshing.)

However, in a conventional clam-shell style laptop computer, where the bottom side of the display is flexibly attached (e.g., via a flexible printed circuit cable) to the top of a housing containing a CPU and/or keyboard and/or other user interface mechanism, the power sourcing and control signals sourcing circuits are typically housed in the CPU/keyboard/other housing, and thus, the correspondingly sourced power signals, data signals and control signals are conveyed from the housing and to the timing control part of the LCD panel by first passing through the lower side of the LCD panel due to the specific structure and to the wiring configuration of the conventional clam-shell style laptop computer. When the power, the data and the control signals are so transferred from the lower side of the LCD panel to the timing control part, where the latter is disposed at the top side of the LCD panel, conductor lines (e.g., flexible printed circuit conductor wires) that are used for transferring the power, data and control signals are lengthened by the extra traversal of the conductor lines from the lower to the upper part of the display panel. Such extra lengthening of the conductor lines tends to increase resistance as well as capacitive and inductive signal couplings, and thus problems such as $I^2R$ losses, noise, crosstalk and other forms of electromagnetic interference tend to occur.

Therefore, it has been recently proposed that the flat panel displays of laptop computers, television sets and the like should be structured to have an inverted mount configuration and should be driven via a from-lower side driving method thus reducing the relative amount of generated heat compared to the from-the-top driving method and/or reducing electromagnetic interference problems.

In the proposed, from-lower side driving method, gate line driving circuits are sequentially driven in shift register style by passing a carry signal from a first gate lines driving circuit disposed at the top side of the LCD panel (per how the user views the inverted-mounted LCD panel) to a last gate lines driving circuit disposed at the lower side of the LCD panel. Thus, the timing control part disposed at the lower side of the from-lower side driven LCD panel nonetheless needs to convey a gate start signal (STV) to the first gate lines driving circuit disposed at a top side of the LCD panel and the gate start conveying wire is lengthened.

Accordingly, in typically structured system that uses the from-the-lower side driving method, a length of a gate start signal line that transfers the gate start signal is longer than the length of the gate start signal line used in the more-conventional from-the-top driving method. Accordingly, a load of the gate start signal line increases due to the relatively longer gate start signal line, and thus image quality of the LCD apparatus may be decreased as a result.

Another problem is that some flat panel display manufacturers may want the option of mounting their display panels according to either of the two methods, namely, according to the from-the-top driving method, or according to the from-lower side driving method. Keeping an inventory of drive electronics for both options can be problematic.

It is to be understood that this background of the technology section is intended to provide useful background for understanding the here disclosed technology and as such, the technology background section may include ideas, concepts or recognitions that are not part of what is known or appreciated by those skilled in the pertinent art prior to corresponding invention dates of subject matter disclosed here-in.

SUMMARY

The present disclosure of invention provides a method of driving a display panel where the method is capable of decreasing heat generated by the display apparatus and is capable of improving image quality.

The present disclosure also provides a display apparatus suitable for performing the above-mentioned method.

According to an example embodiment, there is provided a method of driving a display panel. In the method, first and second frame data are respectively read from first and second regions of a memory in a forward direction, in response to a normal-mounting mode selection signal for displaying a normal image on a display panel. First compensation data are applied to the display panel based on the first and second frame data read in the forward direction. The first and second frame data are read from the first and second regions of the memory in a reverse direction, in response to an inverted-mounting mode selection signal for displaying an up, down, left and right reversed image on the display panel. Second compensation data are applied to the display panel based on the first and second frame data read in the reverse direction.

In one embodiment, the first frame data may be sequentially read from the first region of the memory from a last row address of the first region to a first row address of the first region, and the second frame data may be sequentially read from the second region of the memory from a last row address of the second region to a first row address of the second region, according as the inverted-mounting mode selection signal is applied.

In one embodiment, the first frame data may be sequentially read from the first region of the memory from a last column address of the first region to a first column address of the first region, and the second frame data may be sequentially read from the second region of the memory from a last column address of the second region to a first column address of the second region, as the inverted-mounting mode selection signal is applied.

In one embodiment, in the method, third frame data applied following the second frame data may be further written in the first region of the memory, after the second frame data is read.

In one embodiment, the second frame data may be written in the second region of the memory.

According to another example embodiment, there is provided a method of driving a display panel. In the method, a latch sequence of image data and an output sequence of gate lines driving circuit parts are controlled in a forward direction in response to a normal-mounting mode selection signal for displaying a normal image on a display panel. The image data are latched to data lines driving circuit parts and the display panel includes a plurality of gate lines and a plurality of data lines. The latched image data and gate signals outputted from the gate lines driving circuit parts are applied to the display panel. A dummy gate signal is applied to at least one dummy gate line adjacent to a last gate line of the gate lines, in response to an inverted-mounting mode selection signal for displaying an up, down, left and right reversed image to the display panel. The latch sequence of the image data and the output sequence of the gate lines driving circuit parts are controlled in a reverse direction. The latched image data and the gate signals outputted from the gate lines driving circuit parts are applied to the display panel.

In one embodiment, the dummy gate signal may be applied during an asynchronous period between first and second frame rate control (FRC) chips controlling a frame of the image data.

In one embodiment, the latch sequence of the image data and the output sequence of the gate lines driving circuit parts may be controlled in the forward direction by controlling the data lines driving circuit parts so that the data lines driving circuit parts sequentially latch the image data from a first data lines driving circuit part to a last data lines driving circuit part and controlling the data lines driving circuit parts so that the data lines driving circuit parts sequentially output the image data to a plurality of data channels from the image data applied to a first data channel to the image data applied to a last data channel. The data channels may be respectively connected to the data lines driving circuit parts.

In one embodiment, the latch sequence of the image data and the output sequence of the gate lines driving circuit parts may be controlled in the reverse direction by controlling the data lines driving circuit parts so that the data lines driving circuit parts sequentially latch the image data from a last data lines driving circuit part to a first data lines driving circuit part and controlling the data lines driving circuit parts so that the data lines driving circuit parts sequentially output the image data to a plurality of data channels from the image data applied to a last data channel to the image data applied to a first data channel. The data channels may be respectively connected to the data lines driving circuit parts.

In one embodiment, the latch sequence of the image data and the output sequence of the gate lines driving circuit parts may be controlled in the reverse direction by switching an output sequence of the image data applied to odd-numbered data channels of the data channels and an output sequence of the image data applied to even-numbered data channels of the data channels, when a two-port mode using a first port applying the image data to the odd-numbered data channels and a second port applying the image data to the even-numbered data channels is used.

In one embodiment, the latch sequence of the image data and the output sequence of the gate lines driving circuit parts may be controlled in the forward direction by controlling the gate lines driving circuit parts so that the gate lines driving circuit parts sequentially output gate signals from a first gate lines driving circuit part to a last gate lines driving circuit part and controlling the gate lines driving circuit parts so that the gate lines driving circuit parts sequentially output the gate signals to a plurality of gate channels from a first gate channel to a last gate channel. The gate channels may be respectively connected to the gate lines driving circuit parts.

In one embodiment, the gate lines driving circuit parts may be controlled so that the gate lines driving circuit parts sequentially output the gate signals to the gate channels from the first gate channel to the last gate channel by applying a gate start signal to the first gate lines driving circuit part so that the gate lines driving circuit parts are sequentially driven from the first gate lines driving circuit part to the last gate lines driving circuit part.

In one embodiment, the gate lines driving circuit may be controlled so that the gate lines driving circuit parts sequentially output the gate signals to the gate channels from the first gate channel to the last gate channel by sequentially activating flip-flops from a first flip-flop connected to the first gate channel to a last flip-flop connected to the last gate channel.

In one embodiment, the latch sequence of the image data and the output sequence of the gate lines driving circuit parts may be controlled in the reverse direction by controlling the gate lines driving circuit parts so that the gate lines driving circuit parts sequentially output gate signals from a last gate lines driving circuit part to a first gate lines driving circuit part and controlling the gate lines driving circuit parts so that the gate lines driving circuit parts sequentially output the gate signals to a plurality of gate channels from a last gate channel to a first gate channel. The gate channels may be respectively connected to the gate lines driving circuit parts.

In one embodiment, the gate lines driving circuit may be controlled so that the gate lines driving circuit parts sequentially output gate signals from the last gate lines driving circuit part to the first gate lines driving circuit part by transferring a gate start signal to the last gate lines driving circuit part through the first gate lines driving circuit part so that the gate lines driving circuit parts are sequentially driven from the last gate lines driving circuit part to the first gate lines driving circuit part.

In one embodiment, the gate lines driving circuit parts may be controlled so that the gate lines driving circuit parts sequentially output the gate signals to the gate channels from the last gate channel to the first gate channel by sequentially activating flip-flops from a last flip-flop connected to the last gate channel to a first flip-flop connected to the first gate channel.

According to still another example embodiment of the present invention, a display apparatus includes a display panel, a gate lines driving part, a timing control part and a data lines driving part. The display panel includes a plurality of gate lines and a plurality of data lines. The gate lines driving part applies gate signals to the gate lines. The timing control part respectively writes first and second frame data provided from an outside of the timing control part to first and second regions of a memory, respectively reads the first and second frame data from the first and second regions of the memory in a reverse direction in response to a inverted-mounting mode selection signal for displaying an up, down, left and right reversed image to the display panel, and outputs compensation data based on the first and second frame data read in the reverse direction. The data lines driving part applies the compensation data to the data lines of the display panel.

In one embodiment, the timing control part may sequentially read the first frame data from the first region of the memory from a last row address of the first region to a first row address of the first region, and may sequentially read the second frame data from the second region of the memory from a last row address of the second region to a first row address of the second region.

According to still another example embodiment, a display apparatus includes a display panel, a plurality of gate lines driving circuit parts, a plurality of data lines driving circuit parts and a timing control part. The display panel includes a plurality of gate lines and a plurality of data lines. The gate lines driving circuit parts output gate signals to the gate lines. The data lines driving circuit parts output data signals to the data lines. The timing control part applies a dummy gate signal to at least one dummy gate line adjacent to a last gate line of the gate lines, controls a latch sequence of image data and an output sequence of the gate lines driving circuit parts in a reverse sequence, in response to a inverted-mounting mode selection signal for displaying an up, down, left and right reversed image on the display panel. The image data are latched to the data lines driving circuit parts.

In one embodiment, the timing control part may apply the dummy gate signal to the dummy gate line during an asynchronous period between first and second frame rate control chips controlling a frame of the image data.

According to the present disclosure, previous frame data and present frame data are read in the reverse direction, and thus dynamic capacitance compensation (DCC) data may be generated and an image reversed in up, down, left and right directions of a lower side driving may be displayed. In addition, according to the present invention, the timing control part controls the latch sequence of the image data that is latched to the data lines driving circuit parts and the output sequence of the gate lines driving circuit parts, and thus the image reversed in up, down, left and right directions of the lower side driving may be displayed. Therefore, embodiments in accordance with the present teachings may have decreased heat generated by the display apparatus by shortening a line transferring a gate start signal, which may then improve image quality.

BRIEF DESCRIPTION OF THE DRAWINGS

The above and other features and advantages of the present disclosure of invention will become more readily apparent by describing in detailed example embodiments thereof with reference to the accompanying drawings, in which.

DETAILED DESCRIPTION

Figure 1:
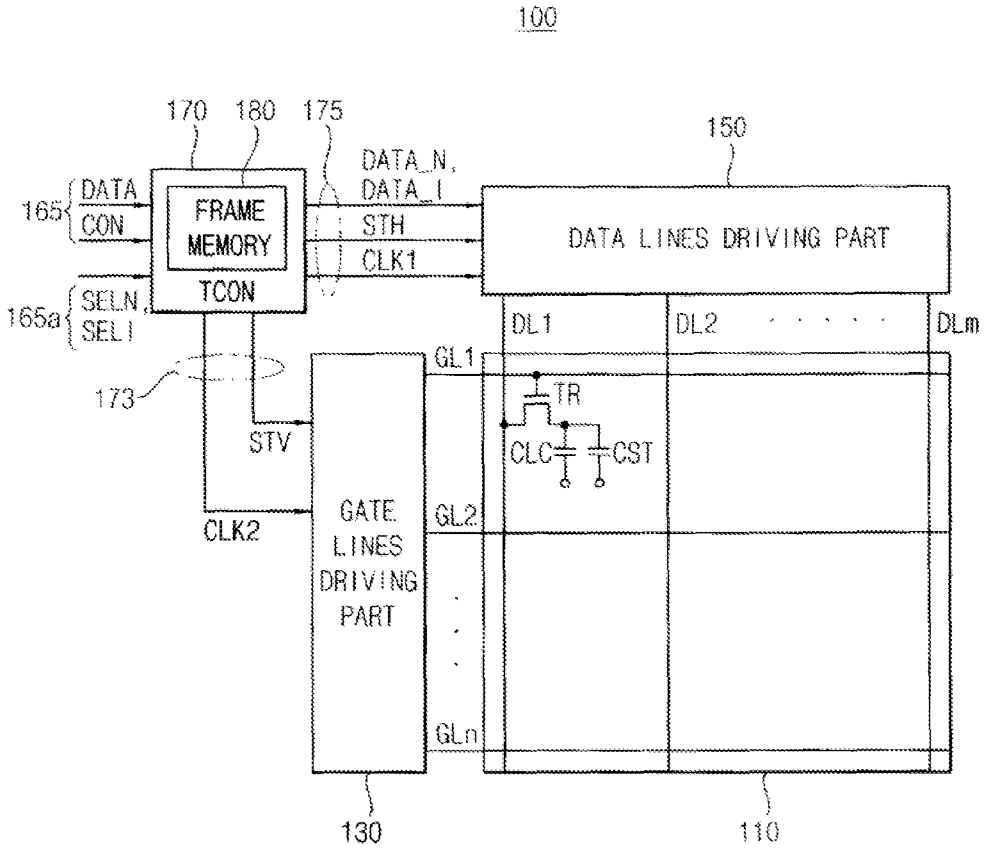
FIG. 1 is a block diagram illustrating a display apparatus according to an example embodiment of the present invention.

The present disclosure of invention is described more fully hereinafter with reference to the accompanying drawings, in which example embodiments are shown. The present teachings may, however, be embodied in many different forms and should not be construed as limited to the example embodiments set forth herein. Rather, these example embodiments are provided so that this disclosure will be thorough and complete, and will fully convey the scope of the present teachings to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the present teachings.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments of the present disclosure should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present teachings.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

FIG. 1 is a block diagram illustrating a display apparatus according to a first example embodiment 100.

Referring to FIG. 1, the display apparatus 100 includes a display panel 110, a gate lines driving part 130, a data lines driving part 150 and a timing control part (TCON) 170.

The display panel 110 includes a plurality of gate lines GL1, GL2, . . . , GLn and a plurality of data lines DL1, DL2, . . . , DLm intersecting with the gate lines GL1, GL2, . . . , GLn. In the present example embodiment, 'n' and 'm' are natural numbers each greater than one.

In addition, the display panel 110 includes a plurality of repeated pixels, and each of the pixels includes a respective switching element TR connected to a respective one of the gate lines GL1, GL2, . . . , GLn and to a respective one of the data lines DL1, DL2, . . . , DLm, a respective liquid crystal capacitor CLC and a respective storage capacitor CST connected to the switching element TR.

The timing control part 170 receives by way of interconnect lines 165, image data signals denoted as DATA and in accordance with a predetermined input writing order, a control signal denoted as CON and mounting-mode selection signals (165*a*) denoted as SELN and SELI from a source disposed outside of the housing (not shown) of the display apparatus 100. The control signal CON may include a horizontal synchronizing signal Hsync, a vertical synchronizing signal Vsync and a clock signal.

Within the timing control part 170 there is provided a frame buffer or memory unit 180 having an address signal input bus 181. When the DATA input signal (of 165) is received in accordance with the predetermined input writing order, address values on the address signal input bus 181 are updated accordingly and in synchronism with the received DATA input signal (of 165). Later, when the stored image data is read out or output from the frame buffer 181, address values on the address signal input bus 181 are updated according to the read-out order and in synchronism with the read-out controlling clock (CLK1).

During read-out of the stored image data, the timing control part (TCON) 170 generates a data start signal STH using the horizontal synchronizing signal Hsync, and outputs the data start signal STH to the data lines driving part 150. In addition, the timing control part 170 generates a gate start signal STV using the vertical synchronizing signal Vsync, and outputs the gate start signal STV to the gate lines driving part 130. In addition, the timing control part 170 generates the aforementioned first clock signal CLK1 that is synchronized with the data read out process and a second clock signal CLK2 using the input clock signal. The timing control part 170 outputs the first clock signal CLK1 to the data lines driving part 150 via bus 175 and the second clock signal CLK2 to the gate lines driving part 130 via bus 173.

The mounting-mode selection signals SELN and SELI respectively indicate, when asserted, a so-called normal display-mounting mode (when SELN is true) and an inverted (reverse) display-mounting mode (when SELI is true).

When external image data is being received (via input bus 165), the timing control part 170 coordinates the writing into the frame memory 180 of first and second frames of image data as supplied in the image data DATA that is provided from the outside source to the frame memory 180. Later, the timing control part 170 coordinates the reading out to the data lines driving part 150 of data derived from the first and second frames of image data stored in the memory 180. The timing control part 170 uses dynamic capacitance compensation (DCC) when reading out the image data to the data lines driving part 150 via bus 175. In one embodiment, the DCC data is produced by a method that includes a comparing of the first and second stored frames of image data to each other.

Figure 2A:
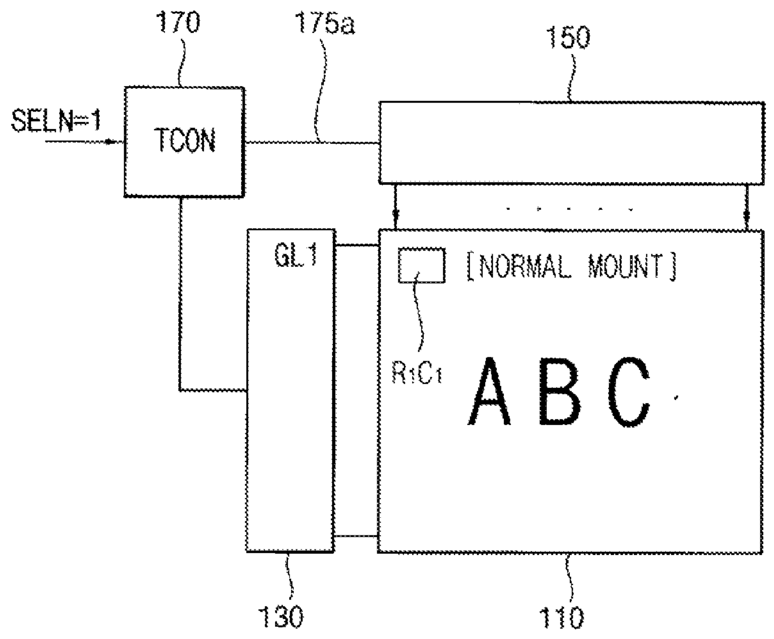
FIG. 2A is a block diagram illustrating a state of the display apparatus in FIG. 1 in a normal-mounting mode.
Figure 2B:
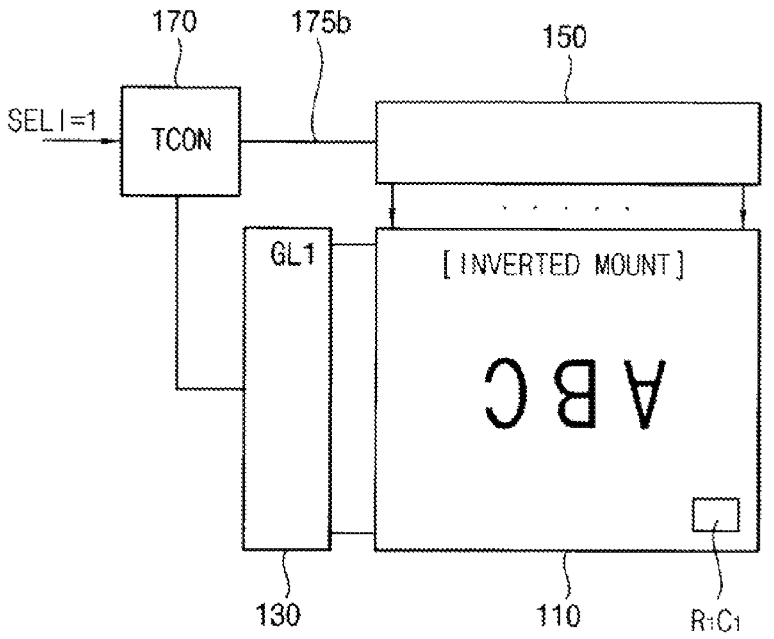
FIG. 2B is a block diagram illustrating a state of the display apparatus in FIG. 1 in a inverted-mounting mode.
Figure 3:
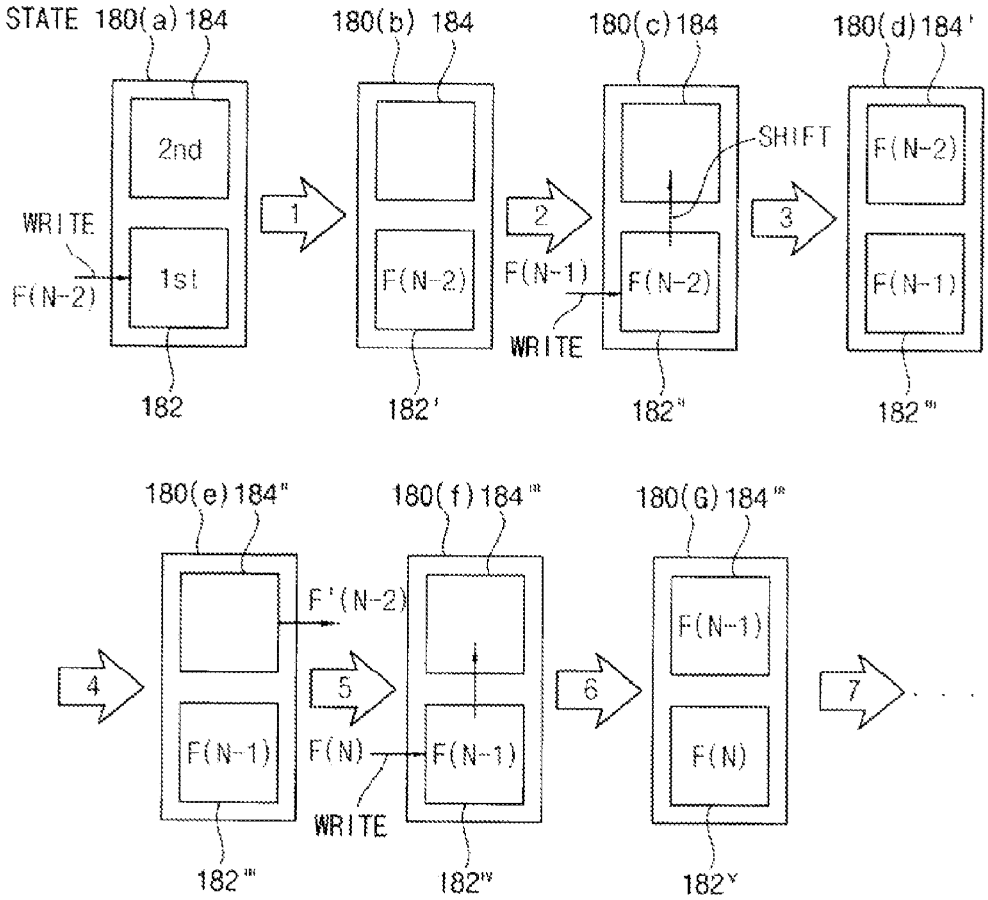
FIG. 3 is a state diagram of a frame memory illustrating a sequence in which first and second frame data are written, and the second frame data are outputted.

For example and referring briefly also to FIG. 3, the timing control part 170 may respectively read the first and then the second frame data from corresponding first region (182) and second region (184) of the frame memory 180 in a here-called, forward direction in automatic response to detection that the normal-mounting mode selection signal SELN is true and is thus calling for displaying of a normally oriented image (see example image 111 of FIG. 2A) on the display panel 110. On the other hand, the timing control part 170 may respectively read the second and then the first frame data from the corresponding second and first regions (184, 182) of the frame memory 180 according to a here-called, reverse direction reading in automatic response to the inverted-mounting mode selection signal SELI being true and thus calling for displaying of a reversed image (see example image 111' of FIG. 2B) on the display panel 110.

Hereinafter, a mode in which the normal-mounting mode selection signal SELN is inputted as logic true ("1") to the timing control part 170 is referred to as the normal-mounting mode, and a mode in which the inverted-mounting mode selection signal SELI is inputted as logic true ("1") to the timing control part 170 is referred to as the inverted-mounting mode.

Figure 1A:
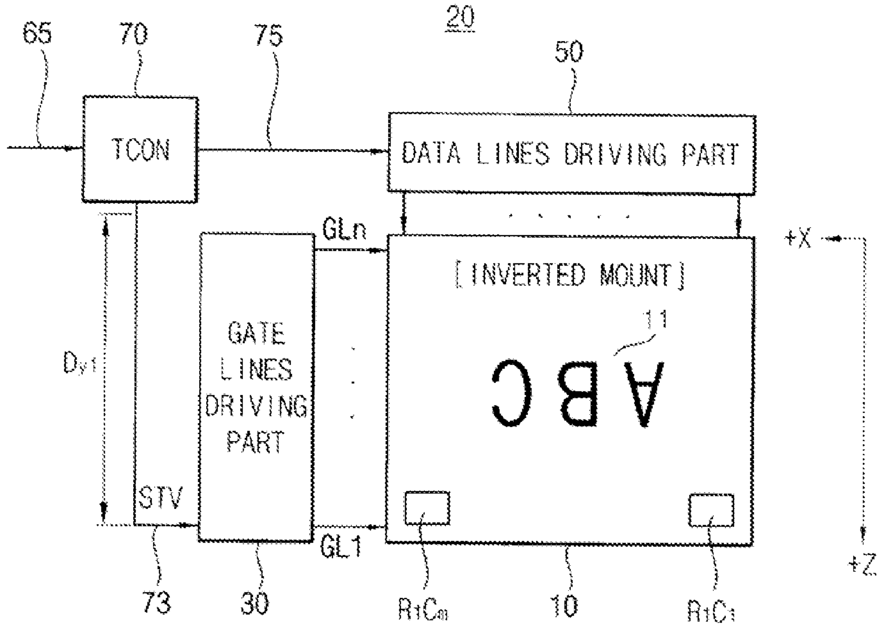
FIG. 1A (PRIOR ART)
FIG. 1A shows an inverted mount mode with conventional data read from frame memory.

Before explaining the embodiment of FIG. 2A, a detour is taken here to explain a first conventional, inverted mounted-mode display system 20 which is shown in FIG. 1A. The signal bus 65 which carries control signals from an externally housed source (not shown) does not carry mounting-mode selection signals in this conventional system 20. This is so because the display panel 10 is always mounted in the illustrated inverted mount way such that the data lines drive circuitry 50 is in the drawing located above the bottom side of the inverted display panel 10, the TCON circuitry 70 is adjacent to the data lines drive circuitry 50 at the bottom of panel 10; and thus the STV-conveying signal bus 73 has a relatively long signal conveyance length denoted as Dy1 in FIG. 1A. As indicated above, power may be wasted and extra heat may be generated due to $I^2R$ losses of power signals conveyed through the extra signal conveyance length Dy1 of bus 73. Also as indicated above, various modes of signal interference may occur as a result of the extra signal conveyance length Dy1.

FIG. 1A shows its inverted mounting-mode image 111 in the form of an example rendition of the letters A, B, C in said order but upside down and reading right to left in the drawing. Of course, other images may be shown. When the device is used physically, the vertical or positive Z axis (+Z) extends from DL driving part 50 up to the top row (R1C1-R1Cm) of the display panel 10. The user sees the +X axis as extending from left to right from the user's point of view. The purpose of the example rendition of the letters A, B, C is to make it easy to quickly which way the image is being refreshed when new image data signals are output from the data lines drive circuitry 50 for writing into corresponding rows of pixels of the normal mounted display area 10. Those skilled in the art will recognize that because image data is being refreshed from the top row (R1C1-R1Cm) of panel 10 towards its bottom row, on row-by-row basis, image refresh operations occur successively in the negative or −Z direction of the illustrated +X and +Z coordinate axes. In other words, the data of memory row R1C1 to R1Cm is read out first on bus 75 and shifted into data lines driving part 50 so that R1C1 is on the right side in the drawing while the STV signal first activates GL1 disposed at the top of the inverted panel 10.

Figure 1B:
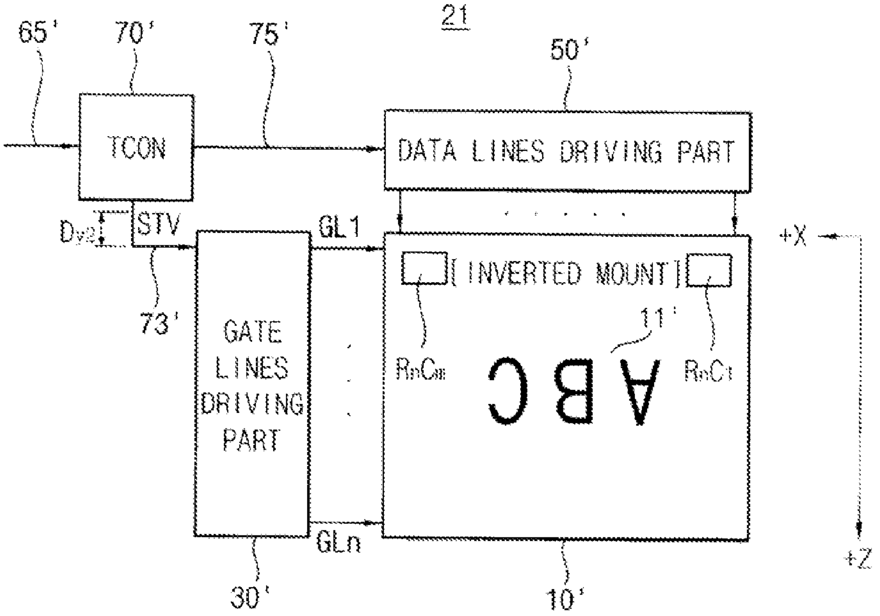
FIG. 1B shows an inverted mount mode with reversed data read from frame memory.

Referring to FIG. 1B, shown here is a second system 21 constructed according to the more recent, from-the-lower side gate-lines driving method. Power and control signals conveying bus 65' is understood to be receiving its signals through a flexible ribbon cable and from a housing disposed in the drawing above the TCON 70' circuitry and above the data lines drive circuitry 50'. As in the case of FIG. 1A, it is to be understood that control signals conveying bus 65' does not convey a mounting-mode selection signal. In other words, display area 10' is again always mounted according to the inverted mounting-mode. However, in FIG. 1B, the image refreshing operations always occur in the +Z direction. That is to say, the last row (RnC1-RnCm) of the image is selected by GL1 and refreshed first while the first row (R1C1 to R1Cm) of the image is selected by GLn and refreshed last. Accordingly, bus 73' has a length Dy2 that is substantially shorter than the Dy1 of FIG. 1A.

With the above explanation of FIGS. 1A-1B in mind, it is to be understood that FIGS. 2A and 2B both depict the same system 100 of FIG. 1 except that the 'normal mounting-mode' is signaled as being selected in FIG. 2A (because SELN="1") and the inverted mounting-mode is signaled as being selected in FIG. 2B (because SELI="1"). In other words, FIG. 2A is a block diagram illustrating a state of the display apparatus in FIG. 1 wherein the mounting-mode selection signal 165*a* is in a corresponding first state and the data output from the frame memory and read out along bus 175*a* is configured according to a first outputting order (image pixel R1C1 is refreshed first). FIG. 2B is a block diagram illustrating a state of the display apparatus in FIG. 1 wherein the mounting-mode selection signal 165*b* is in a corresponding second state (indicated SELI is true) and the data output from the frame memory and read out along bus 175*b* is configured according to a second outputting order (image pixel R1C1 is refreshed last).

FIG. 3 is a state versus timing diagram illustrating states of the frame buffer memory 180 as a sequence of received first image frame data and second image frame data are received from an external source and written into corresponding frame storing areas, 182, 184 of the frame memory 180, and then the stored frames of data are read out from, modified, and thus outputted from the frame memory 180 as DCC modified data.

As illustrated in FIG. 3, the frames buffer memory 180 can be logically subdivided and thus seen as having respective first and second storage regions, 182 (1st) and 184 (2nd).

An illustrated first state 180(*a*) of the frames buffer 180 represents a state wherein regions 182 and 184 can be considered to both be empty and wherein the timing control part 170 is writing a first frame's worth of image data, F(N−2) into the first region 182. Here, N−2 represents received frame data that is two frames older and earlier than a later in time frame denoted as F(N).

After F(N−2) is fully stored in lower region 182' (it is 182 primed because it now has valid F(N−2) data fully stored in it) as depicted by illustrated state 180(*b*), in a next and third state 180(*c*), the timing control part 170 is causing a real or virtual shifting of the stored first frame of data F(N−2) to the upper second region 184 so that new empty space is created in lower region 182" and the timing control part 170 can thereby at the same time begin writing the next received frame of image data F(N−1) into the unoccupied parts of first region 182". Although for the sake of conceptual simplicity, FIG. 3 is showing frames of stored image data as being physically moved (shifted), at least in one embodiment, they are not actually moved but rather they are only logically re-designated (and thus virtually shifted) as being in one logical subdivision or another of frame buffer 180, where frame buffer 180 can be implemented as a circular buffer with read and write pointers rotating to point at sequential positions there around.

Illustrated state 180(*d*) of the frames buffer 180 represents a state wherein its corresponding regions 182''' and 184' are now respectively storing the data of written-in image frames F(N−1) and F(N−2). When this state 180(*d*) is achieved, the timing control part 170 is able fetch comparative samples of data of the first and second frame data, F(N−2) and F(N−1), and is able to compare the first and second frame data F(N−2) and F(N−1) with each other, and to use the comparison results to optionally generate overdrive data (DCC data) that is to be substituted as a derived output signal, F'(N−2) (note F is primed here) in place of the original first frame data F(N−2). In other words, modified signal F'(N−2) is to be output, as the DCC-compensated image data. For example, the DCC data of the so-revised first frame data F'(N−2) may be data whose luminance values have been enhanced by adding a value larger than a difference between grayscales of the first and second frame data F(N−2) and F(N−1) to the grayscales of the original first frame data F(N−2).

In next illustrated state 180(*e*), the timing control part 170 starts outputting (e.g., reading out from a memory) the DCC-compensated image data F'(N−2) as derived from logical region 184" and this operation makes room for logically shifting in the later received and next frame of original data, F(N−1) into the second region 184''' as is schematically illustrated by state 180(*f*). At the same time, the timing control part 170 is writing the next-received or third frame of original image data F(N) into made available empty storage spaces in the first region $\mathbf{182}^{IV}$ (where the Roman numerated superscript, "IV" denotes the next state of 182 after state 182''').

In next state 180(*g*), after the timing control part 170 has stored the third frame of original image data F(N) to first region $\mathbf{182}^{V}$ and has shifted the second frame of original image data F(N−1) into first region $\mathbf{184}^{IV}$, the timing control part 170 can perform the next original-versus-original image data comparison and can then generate compensated data (e.g., DCC data) based on the comparison where the compensated data may thereafter be over-written into or derived from top region $\mathbf{184}^{IV}$. Then in a next step (not fully shown), the compensated image data F'(N−1) will be read out just as compensated image data F'(N−2) was read out in state 180(*e*). Although the description of these pipelined operations have been set out to imply that whole frames might need to be stored before comparison and generation of compensated data begins, those skilled in the art will appreciate from the foregoing that operations can be pipelined so that all are occurring in parallel and in sequential parts of a pipelined data processing mechanism, where the frames buffer 180 is part of that pipelined data processing mechanism. Operations can occur on a row-by-row basis rather than needing whole frames to be made available.

Figure 4:
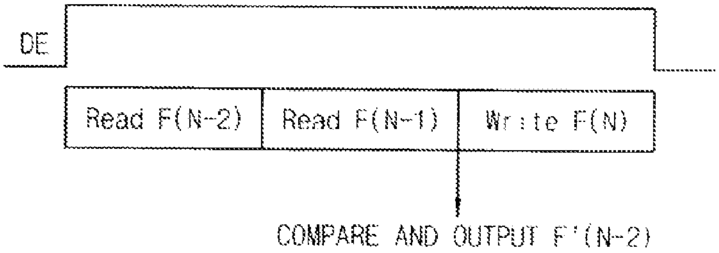
FIG. 4 is a conceptual diagram illustrating an operation sequence of a timing control part.

FIG. 4 is a conceptual diagram illustrating a pipelined operation that can occur in sequential parts of a pipelined data processing mechanism under control of the timing control part. More specifically and referring to FIGS. 3 and 4, when the data processing is enabled by the dual read enabling signal, DE the timing control part 170 can be viewed as fetching corresponding pieces of original image data, F(N−2) and F(N−1) from the respectively stored frames of original image data, F(N−1) and F(N−2) of state 180(*d*), comparing the fetched samples, generating the compensated data item F'(N−2) for output per state 180(*e*) and also initiating the writing in of new data item F(N) per the operation indicated in state 180(*f*) of FIG. 3.

Figure 5A:
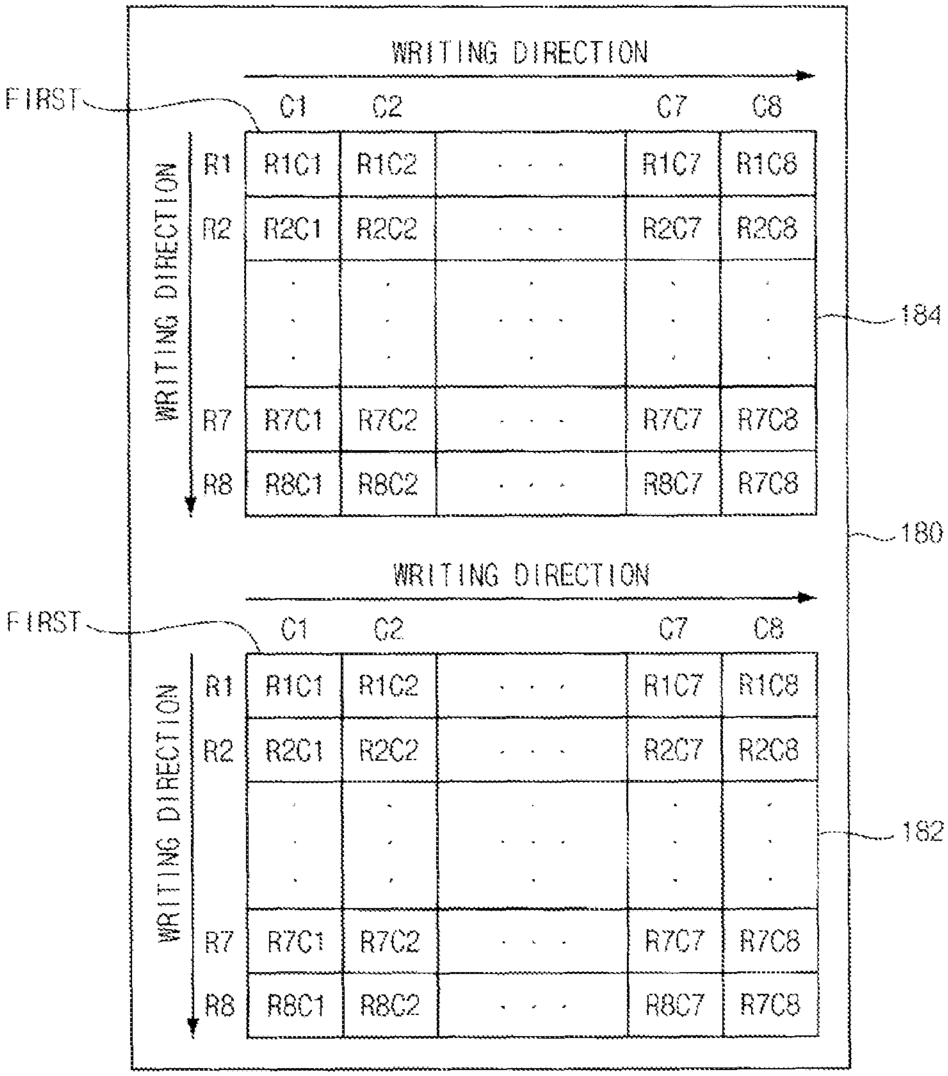
FIG. 5A is a conceptual diagram illustrating a direction in which the timing control part writes the first and second frame data to a frame memory.
Figure 5B:
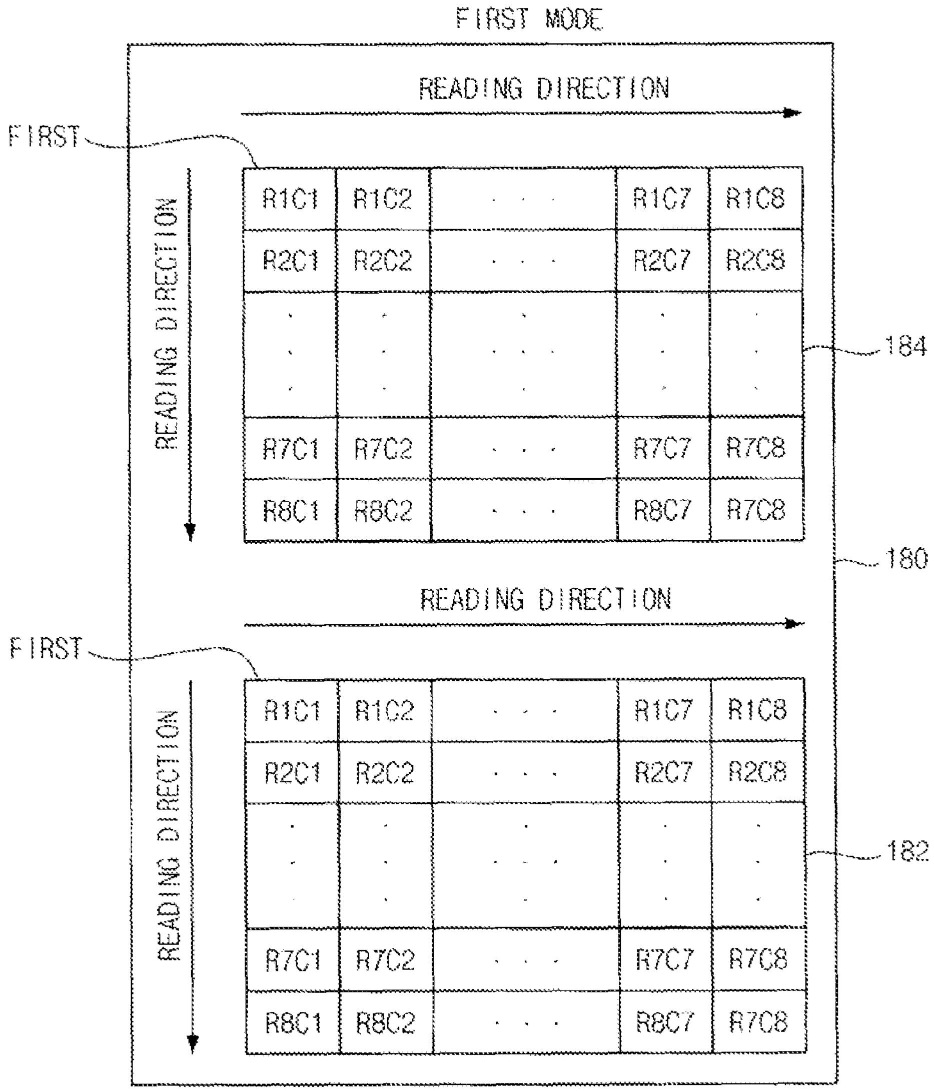
FIG. 5B is a conceptual diagram illustrating a direction in which the timing control part reads the first and second frame data from the frame memory in the normal-mounting mode.
Figure 5C:
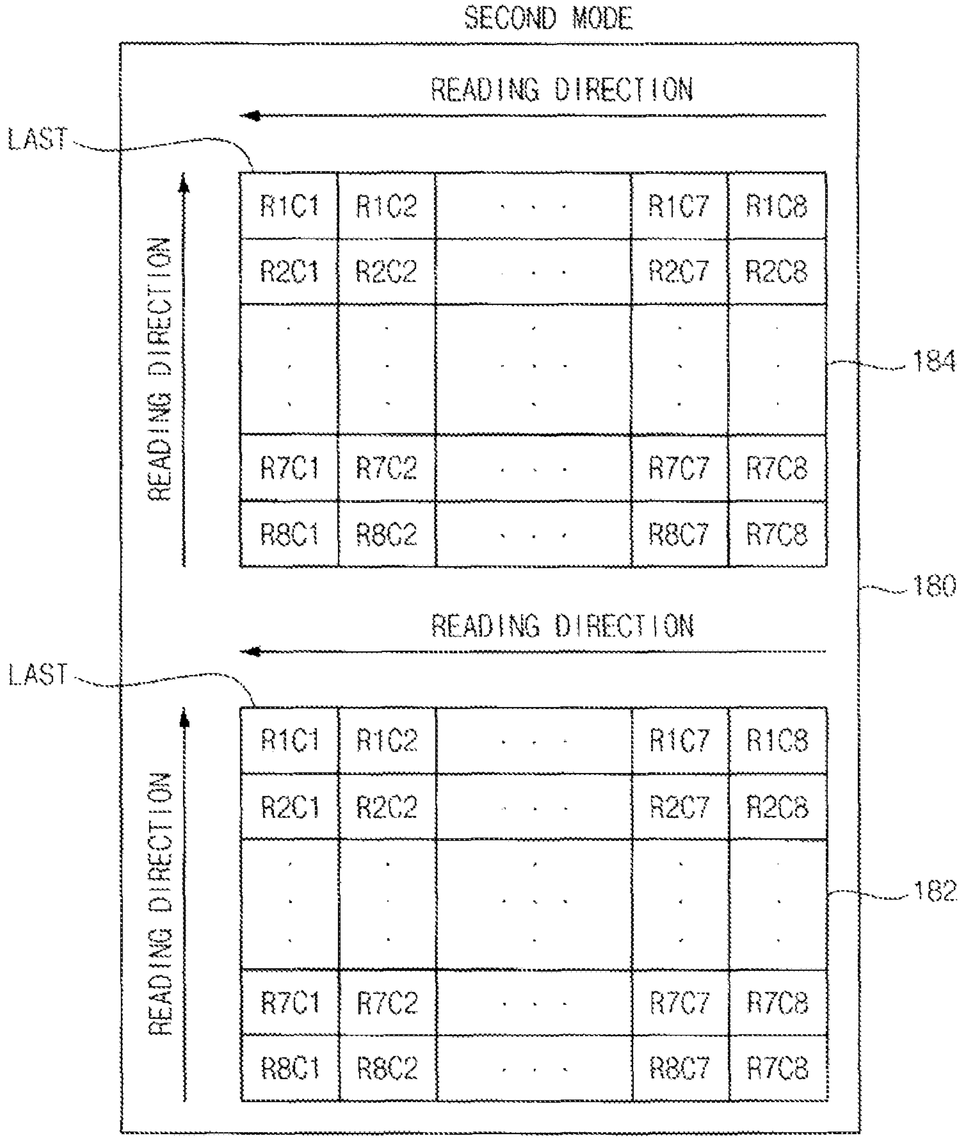
FIG. 5C is a conceptual diagram illustrating a direction in which the timing control part reads the first and second frame data from the frame memory in the inverted-mounting mode.

FIG. 5A is a conceptual diagram illustrating a conventional, hierarchical order in which the timing control part receives original image data from an external source and writes the corresponding first and second frame data to a frame buffers memory 180. FIG. 5B is a conceptual diagram illustrating a direction in which the timing control part reads out the first and second frame data from the frame buffer memory when the normal-mounting mode is indicated. FIG. 5C is a conceptual diagram illustrating a direction in which the timing control part reads out the first and second frame data from the frames buffering memory 180 when the inverted-mounting mode is indicated. More specifically, in FIG. 5C, image row R1C1-R1Cm (where m=8) is last to be read out from the frames buffering memory 180. For convenience of description, it is assumed that the timing control part 170 writes the first frame data F(N−2) to the first region 182 of the frame memory 180 and writes the second frame data F(N−1) to the second region 184 of the frame memory 180, and then reads outs the compensated first and second frames of data F'(N−2) and F'(N−1) in the recited order.

Referring to the details of FIG. 5A, the first region 182 includes a respective plurality of row addresses R1, R2, . . . , R7 and R8 and a plurality of column addresses C1, C2, . . . , C7 and C8, and the second region 184 includes a respective plurality of row addresses R1, R2, . . . , R7 and R8 and a plurality of column addresses C1, C2, . . . , C7 and C8. For convenience of description, in the present example embodiment, each of numbers of row addresses and column address included in the first region 182 and the second region 184 is eight, but the number of the row addresses may be n (a natural number greater than one) and the number of the column addresses may be m (a natural number greater than one).

When the normal-mounting mode is determined to be true, the timing control part 170 writes the first and second frame data F(N−2) and F(N−1) to the first and second regions 182 and 184 in the forward directions and it also reads out the compensated frame data (FIG. 5B) in the forward directions in response to the normal-mounting mode selection signal SELN being true.

Thus, the timing control part 170 sequentially writes-in the first received frame of image data F(N−2) to the first region 182 sequentially from a first row address R1 to a last row address R8 and also within each row from a first column address C1 to a last column address C8, and it sequentially writes-in the second received frame of image data F(N−1) to the second region 184 also from a first row address R1 to a last row address R8 and from a first column address C1 to a last column address C8.

For example, when the timing control part 170 writes the first frame data F(N−2) to the first region 182, the timing control part 170 sequentially writes the first row address R1, the second row address R2, . . . , the seventh row address R7 and the eighth address R8 and sequentially writes the first column address C1, the second column address C2, . . . , the seventh column address C7 and the eighth column address C8.

In the same manner, when the timing control part 170 writes the second frame data F(N−1) to the second region 184, the timing control part 170 sequentially writes the first row address R1, the second row address R2, . . . , the seventh row address R7 and the eighth address R8 and sequentially writes the first column address C1, the second column address C2, . . . , the seventh column address C7 and the eighth column address C8.

In other words, in one embodiment, when the timing control part 170 writes-in the first frame data F(N−2) to the first region 182, the timing control part 170 sequentially writes to an R1C1 address, then to an R1C2 address, . . . , an R1C7 address and an R1C8 address and sequentially writes to an R8C1 address, an R8C2 address, . . . , an R8C7 address and lastly to an R8C8 address.

In addition, when the timing control part 170 writes the second frame data F(N−1) to the second region 184, the timing control part 170 sequentially writes to an R1C1 address, then to an R1C2 address, . . . , an R1C7 address and an R1C8 address and sequentially writes an R8C1 address, an R8C2 address, . . . , an R8C7 address and lastly to an R8C8 address.

Referring to FIG. 5B, when the normal-mounting mode is determined to be true, a direction in which the timing control part 170 reads-out the first and second frame data F(N−2) and F(N−1) from the frame memory 180 is substantially the same as a forward direction in which the timing control part 170 writes in the first and second frame data F(N−2) and F(N−1).

Thus, when the timing control part 170 reads the first frame data F(N−2) from the first region 182, the timing control part 170 sequentially reads from the first row address R1 to the last row address R8 and from the first column address C1 to the last column address C8. For example, the timing control part 170 reads the first frame data F(N−2) in the sequence of the first row address R1, the second row address R2, . . . , the seventh row address R7 and the eighth address R8 and in the sequence of the first column address C1, the second column address C2, . . . , the seventh column address C7 and the eighth column address C8.

In the same manner, when the timing control part 170 reads the second frame data F(N−1) from the second region 184, the timing control part 170 sequentially reads from the first row address R1 to the last row address R8 and from the first column address C1 to the last column address C8. For example, the timing control part 170 reads the second frame data F(N−1) in the sequence of the first row address R1, the second row address R2, . . . , the seventh row address R7 and the eighth row address R8 and in the sequence of the first column address C1, the second column address C2, . . . , the seventh column address C7 and the eighth column address C8.

In other words, in one embodiment, when the timing control part 170 reads the first frame data F(N−2) from the first region 182, the timing control part 170 sequentially reads from an R1C1 address, then from the R1C2 address, . . . , the R1C7 address and the R1C8 address and sequentially reads the R8C1 address, the R8C2 address, . . . , the R8C7 address and the R8C8 address.

In addition, when the timing control part 170 reads the second frame data F(N−1) from the second region 184, the timing control part 170 sequentially reads from the R1C1 address, then from the R1C2 address, . . . , the R1C7 address and the R1C8 address and sequentially reads the R8C1 address, the R8C2 address, . . . , the R8C7 address and the R8C8 address.

However, and referring here to FIG. 5C, when the inverted-mounting mode is determined by machine-implemented operation to be true, the direction in which the timing control part 170 reads-out the (optionally compensated) first and second frame data F(N−2) and F(N−1) from the frame buffer memory 180 is a reverse direction that is reverse to the forward direction in which the timing control part 170 writes the first and second frame data F(N−2) and F(N−1).

Thus, when the timing control part 170 reads the first frame data F(N−2) from the first region 182, the timing control part 170 sequentially reads from the last row address R8 to the first row address R1 and from the last column address C8 to the first column address C1. For example, the timing control part 170 reads the first frame data F(N−2) in a sequence of the eighth row address R8, the seventh row address R7, . . . , the second row address R2 and lastly the first row address R1, and in a sequence of the eighth column address C8, the seventh column address C7, . . . , the second column address C2 and the first column address C1.

In the same manner, when the timing control part 170 reads the second frame data F(N−1) from the second region 184, the timing control part 170 sequentially reads from the last row address R8 to the first row address R1 and from the last column address C8 to the first column address C1. For example, the timing control part 170 sequentially reads the second frame data F(N−1) in a sequence of the last row address R8, the seventh row address R7, . . . , the second row address R2 and the first row address R1, and in a sequence of the last column address C8, the seventh column address C7, . . . , the second column address C2 and the first column address C1.

In other words, in one embodiment, when the timing control part 170 reads-out the first frame data F(N−2) from the first region 182, the timing control part 170 sequentially reads from the R8C8 address, then from the R8C7 address, . . . , the R8C2 address and the R8C1 address, and sequentially reads the R1C8 address, the R1C7 address, . . . , the R1C2 address and lastly from the R1C1 address.

In addition, when the timing control part 170 reads the second frame data F(N−1) from the second region 184, the timing control part 170 sequentially reads the R8C8 address, the R8C7 address, . . . , the R8C2 address and the R8C1 address and sequentially reads the R1C8 address, the R1C7 address, . . . , the R1C2 address and the R1C1 address.

Referring to FIG. 1 again, the timing control part 170 differently reads-out the first and second frame data F(N−2) and F(N−1) written into and stored in the frame memory 180 in response to one or another of the selection signals SELN and SELI being true, and thus outputs corresponding normal mounting-mode, compensated image data DATA_N and reverse mounting-mode, compensated image data DATA_I to the data lines driving part 150 according to which mounting-mode is automatically determined to be true.

For example, the timing control part 170 reads the first and second frame data F(N−2) F(N−1) in a direction substantially same as the direction in which the timing control part 170 writes the first and second frame data F(N−2) F(N−1) and outputs the normal image data DATA_N when in the normal-mounting mode, and the timing control part 170 reads out the first and second frame data F(N−2) and F(N−1) in a direction reverse to the direction in which the timing control part 170 writes the first and second frame data F(N−2) and F(N−1) and outputs the reverse image data DATA_I when in the inverted-mounting mode, where the mounting-mode that is true is automatically determined by determining the logical state of mounting-mode selection signals, SELN and SELI.

As indicated above, the output normal mounting-mode image data DATA_N supplied to the DL driving part 150 may be first DCC data generated by comparing the first and second frame data F(N−2) and F(N−1) read in the forward direction, and the read-out reverse mounting-mode image data DATA_I may be different second DCC data generated by comparing the first and second frame data F(N−2) and F(N−1) fetched in the reverse direction.

The data lines driving part 150 outputs parallelized versions of the first DCC data or the second DCC data to the data lines DL1, DL2, . . . , DLm in response to the first clock signal CLK1 and the data start signal STH provided from the timing control part 170.

The gate lines driving part 130 generates gate signals using the gate start signal STV and the second clock signal CLK2 which are provided from the timing control part 170, and outputs the gate signals to the gate lines GL1, GL2, . . . , GLn. Although the numbering of gate lines GL1 through GLn does not change, the determination as to which should be activated first and which last does change depending on whether SELN is true or SELI is true (="1").

Figure 6:
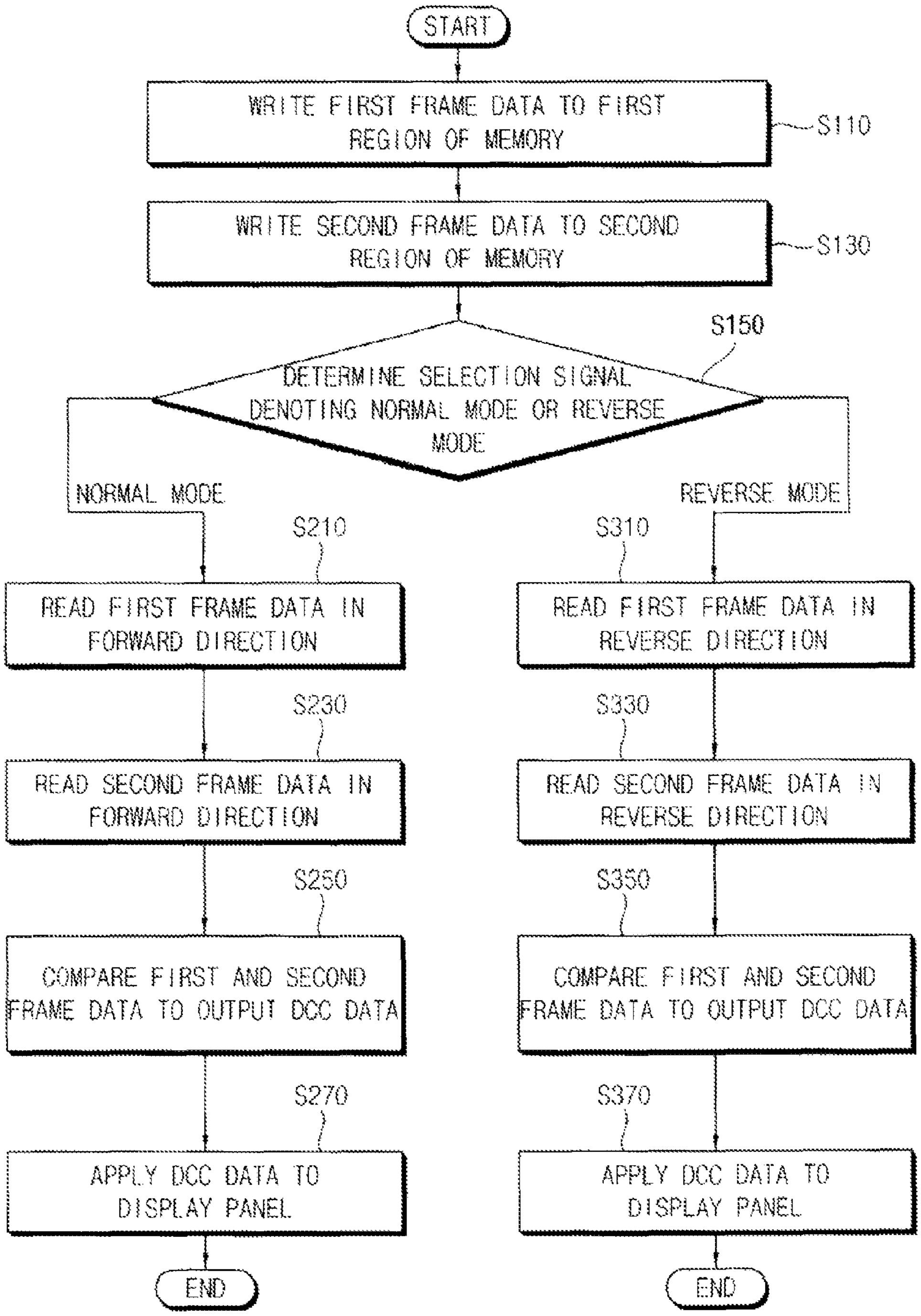
FIG. 6 is a flowchart illustrating a method of driving the display panel in FIG. 1.

FIG. 6 is a flowchart illustrating a method of driving the display panel in FIG. 1 where the method behaved differently depending on whether SELN is true or SELI is true.

Referring to FIGS. 1 to 6, the timing control part 170 writes the first frame data F(N−2) to the first region 182 of the frame memory 180 in the forward direction (step S110).

For example, the timing control part 170 writes the first frame data F(N−2) to the first region 182 in a sequence of the first row address R1, the second row address R2, . . . , the seventh row address R7 and the eighth address R8 and in a sequence of the first column address C1, the second column address C2, . . . , the seventh column address C7 and the eighth column address C8.

The timing control part 170 writes the second frame data F(N−1) following the first frame data F(N−2) to the second region 184 (step S130).

For example, the timing control part 170 sequentially writes the second frame data F(N−1) to the second region 184 in a sequence of the first row address R1, the second row address R2, . . . , the seventh row address R7 and the eighth address R8 and in a sequence of the first column address C1, the second column address C2, . . . , the seventh column address C7 and the eighth column address C8.

The timing control part 170 writes the second frame data F(N−1) to the first region 182, after the timing control part 170 shifts (e.g., virtually) the first frame data F(N−2) to the second region 184.

The timing control part 170 then automatically processes the received the selection signals SELN and SELI which indicate whether the display area mode is the normal-mounting mode or the inverted-mounting mode, and the timing control part 170 thus automatically determines in a machine-implemented way whether the mode is the normal-mounting mode or the inverted-mounting mode (step S150).

If the normal-mounting mode is found to be true, the timing control part 170 reads the first frame data F(N−2) written in the frame memory 180 in the direction substantially the same as the direction in which the timing control part 170 writes the first frame data F(N−2) (step S210). In addition, the timing control part 170 reads the second frame data F(N−1) written in the frame memory 180 in the direction in which the timing control part 170 writes the second frame data F(N−1) (step S230).

The timing control part 170 then generates the first DCC data by comparing the first and second original frames of image data F(N−2) and F(N−1) read-out from the frame memory 180 with each other, and outputs the first corresponding DCC (or otherwise compensated) data to the data lines driving part 150 (step S250).

The data lines driving part 150 applies the first DCC data to the display panel 110 (step S270).

On the other hand, if the inverted-mounting mode is determined to be true, the timing control part 170 reads the first frame data F(N−2) written in the frame memory 180 in the direction reverse to the direction in which the timing control part 170 writes the first frame data F(N−2) (step S310). In addition, the timing control part 170 reads the second frame data F(N−1) written in the frame memory 180 in the direction reverse to the direction in which the timing control part 170 writes the second frame data F(N−1) (step S330).

The timing control part 170 then generates the second DCC data by comparing the first and second frame data F(N−2) and F(N−1) as read-out in the reverse directions from the frame memory 180 with each other, and outputs the second DCC data to the data lines driving part 150 (step S350).

The data lines driving part 150 applies the second DCC data to the display panel 110 (step S370).

According to the present example embodiment, the timing control part 170 reads the first frame data F(N−2) and the second frame data F(N−1) in the direction reverse to the direction in which the timing control part 170 writes the first and second frame data F(N−2) and F(N−1) to the frame memory 180, and thus the reverse image that is reversed in up, down, left and right directions in comparison with the normal image may be displayed on the display panel 110.

In addition, the timing control part 170 reads the first and second frame data F(N−2) and F(N−1) after the timing control part 170 writes the first and second frame data F(N−2) and F(N−1) to the frame memory 180, and thus the timing control part 170 may generate the DCC data by comparing the first and second frame data F(N−2) and F(N−1) with each other, when the timing control part 170 reads the first and second frame data F(N−2) and F(N−1) not only in the direction substantially the same as the direction in which the timing control part 170 writes the first and second frame data F(N−2) and F(N−1) but also in the direction reverse to the direction in which the timing control part 170 writes the first and second frame data F(N−2) and F(N−1).

Figure 7:
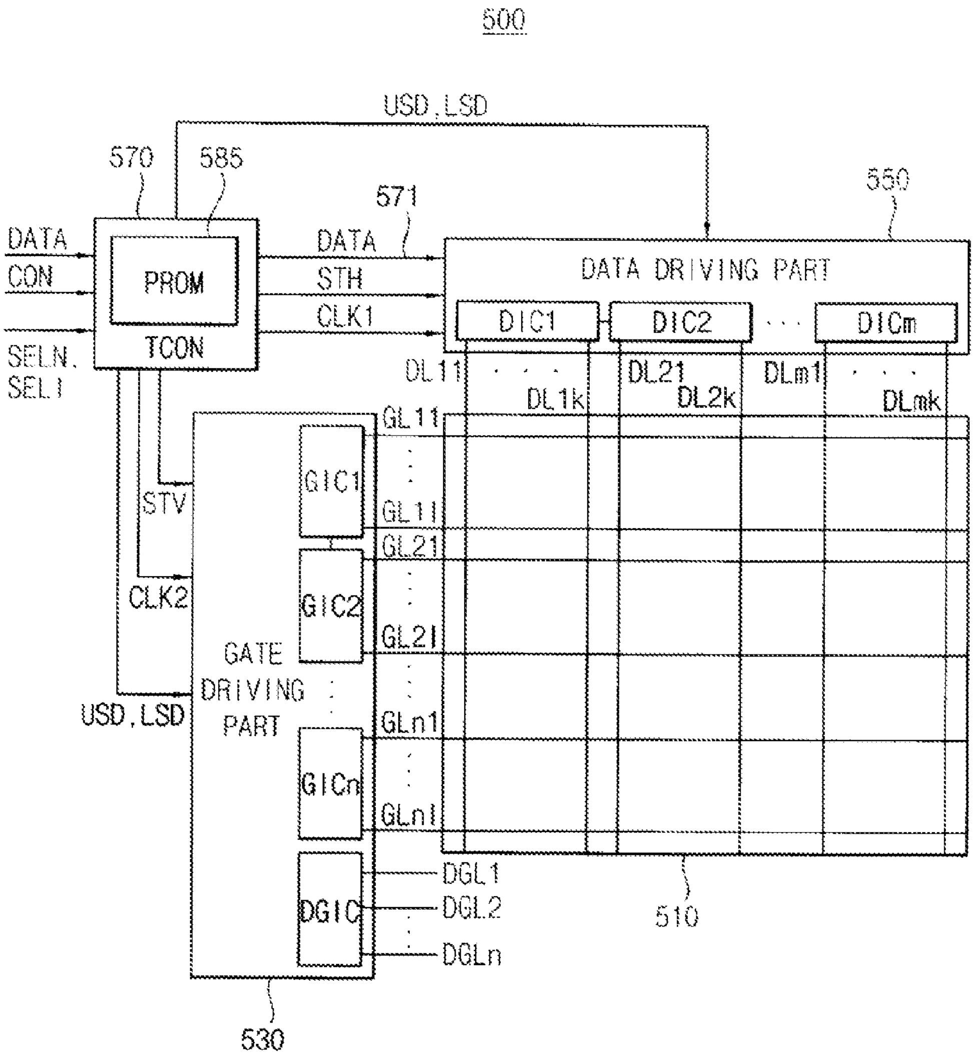
FIG. 7 is a block diagram illustrating a display apparatus according to another example embodiment of the present invention.

FIG. 7 is a block diagram illustrating a display apparatus according to another example embodiment.

Referring to FIG. 7, the display apparatus according to an example embodiment which includes a display panel 510, a gate lines driving part 530, a data lines driving part 550 and a timing control part 570.

The display panel 510 includes a plurality of gate lines GL11, . . . , GL1*i*, GL21, . . . , GL2*i*, . . . , GLn1, . . . , GLni and a plurality of data lines DL11, . . . , DL1*k*, DL21, . . . , DL2*k*, . . . , DLm1, . . . , DLmk intersecting with the gate lines GL11, . . . , GL1*i*, GL21, . . . , GL2*i*, . . . , GLn1, . . . , GLni.

The timing control part 570 receives image data DATA, a control signal CON and mounting-mode selection signals SELN and SELI from an outside source of the display apparatus 500, and the control signal CON may include a horizontal synchronizing signal Hsync, a vertical synchronizing signal Vsync and a clock signal.

The timing control part 570 generates a data start signal STH using the horizontal synchronizing signal Hsync, outputs the data start signal STH to the data lines driving part 550, generates a gate start signal STV using the vertical synchronizing signal Vsync, and outputs the gate start signal STV to the gate lines driving part 530. In addition, the timing control part 570 generates a first clock signal CLK1 and a second clock signal CLK2 using the clock signal, and outputs the first clock signal CLK1 to the data lines driving part 550 and the second clock signal CLK2 to the gate lines driving part 530.

The selection signals include a normal-mounting mode selection signal SELN and an inverted-mounting mode selection signal SELI. Hereinafter, a mode in which the normal-mounting mode selection signal SELN is inputted as true to the timing control part 570 is referred to as a normal-mounting mode, and a mode in which the inverted-mounting mode selection signal SELI is inputted as true to the timing control part 570 is referred to as a inverted-mounting mode.

The timing control part 570 receives the mounting-mode selection signals SELN and SELI and automatically determines therefrom whether the mode is the normal-mounting mode or the inverted-mounting mode.

Figure 8:
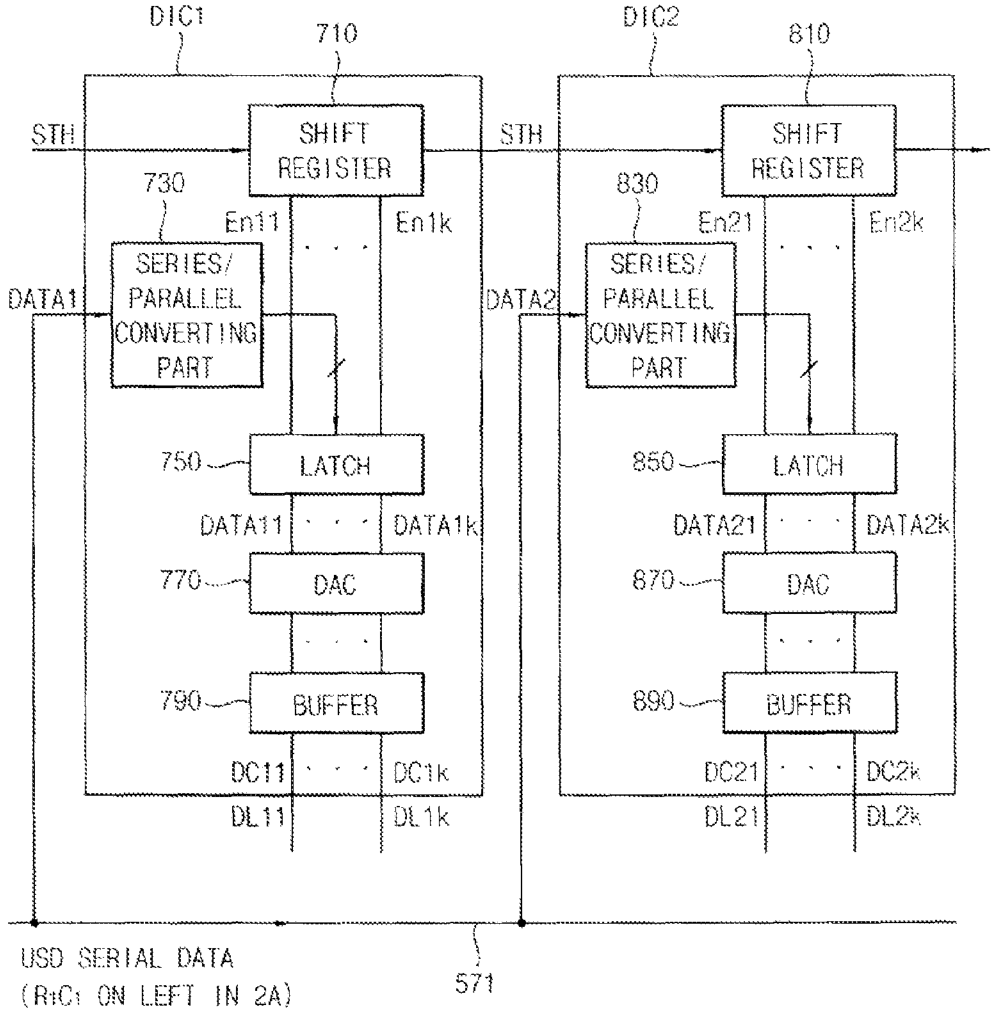
FIG. 8 is a block diagram illustrating a first data lines driving circuit part and a second data lines driving circuit part for explaining an output sequence of image data applied to a plurality of channels in the normal-mounting mode.

When the timing control part 570 determines that the mode is the normal-mounting mode, the timing control part 570 outputs a normal-mounting mode indicating signal, USD (usual serial data) to the gate lines driving part 530 and the data lines driving part 550, and controls an output sequence of the gate lines driving part 530 and a latch sequence of serially provided image data DATA that are latched to the data lines driving part 550 in the forward direction (so that in FIG. 8, discussed soon, R1C1 is latched into a left side latch).

Figure 9:
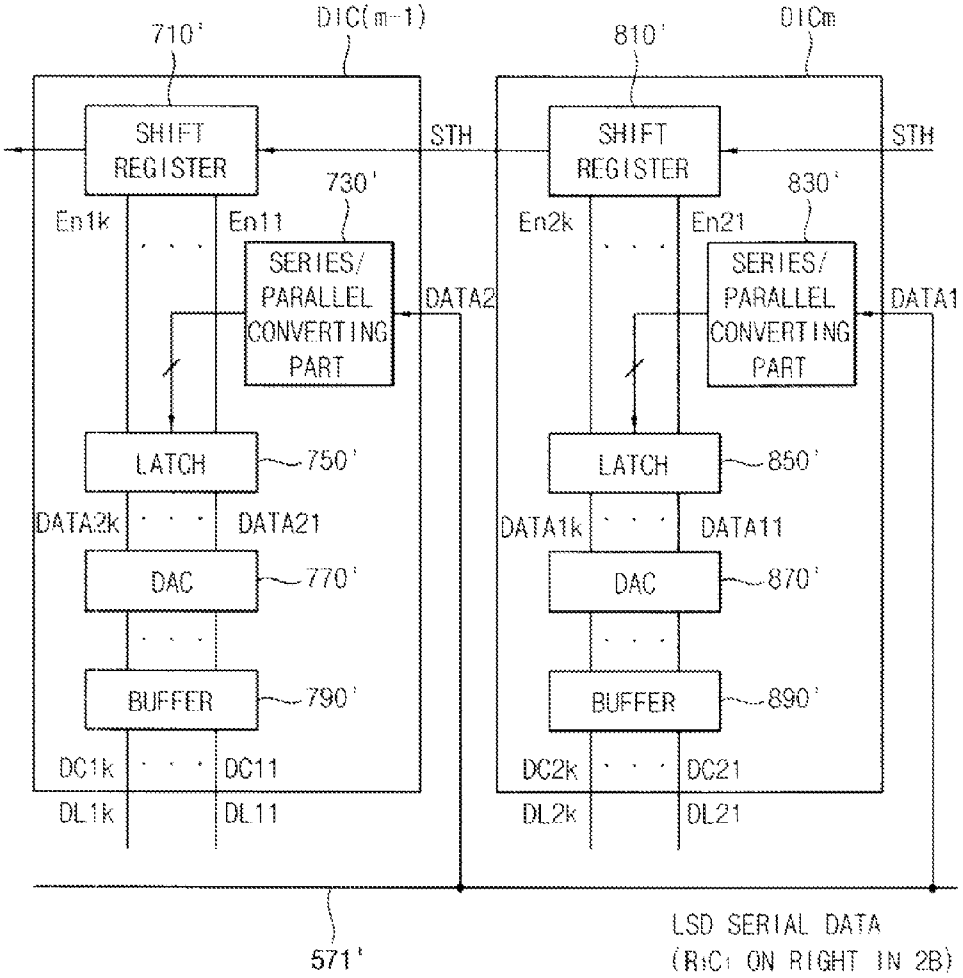
FIG. 9 is a block diagram illustrating the first data lines driving circuit part and the second data lines driving circuit part for explaining the output sequence of the image data applied to the plurality of channels in the inverted-mounting mode.

When the timing control part 570 determines that the mode is the inverted-mounting mode, the timing control part 570 outputs a inverted-mounting mode indicating signal, LSD to the gate lines driving part 530 and the data lines driving part 550, and controls the output sequence of the gate lines driving part 530 and the latch sequence of the image data DATA that are latched to the data lines driving part 550 in the reverse direction (so that in FIG. 9, discussed soon, R1C1 is latched into a right side latch).

The data lines driving part 550 includes a first data lines driving circuit part DIC1, a second data lines driving circuit part DIC2, . . . , an m-th data lines driving circuit part DICm.

The latch sequence of which the data lines driving circuit parts DIC1, DIC2, . . . , DICm latch the image data DATA is controlled differently, according as whether the data lines driving part 550 receives the normal-mounting mode indicating signal USD or the inverted-mounting mode indicating signal LSD.

When the data lines driving part 550 receives the normal-mounting mode indicating signal USD, the latch sequence of the image data DATA that are latched to the data lines driving circuit parts DIC1, DIC2, . . . , DICm is in the forward direction, and thus the image data DATA are sequentially latched to the data lines driving circuit parts DIC1, DIC2, . . . , DICm from the first data lines driving circuit part DIC1 to the m-th data lines driving circuit part DICm.

When the data lines driving part 550 receives the inverted-mounting mode indicating signal LSD, the read out of each row from the frames buffer memory is still in the forward direction, however the latch sequence of the image data DATA that are latched to the data lines driving circuit parts DIC1, DIC2, . . . , DICm is in the reverse direction, and thus the image data DATA are sequentially latched to the data lines driving circuit parts DIC1, DIC2, . . . , DICm from the m-th data lines driving circuit part DICm to the first data lines driving circuit part DIC1.

Each of the data lines driving circuit parts DIC1, DIC2, . . . , DICm may include a plurality of data channels.

For example, the first data lines driving circuit part DIC1 may include a first data channel, a second data channel, . . . , a (k−1)-th data channel and a k-th data channel.

FIG. 8 is a block diagram illustrating a first data lines driving circuit part and a second data lines driving circuit part for explaining an output sequence of image data applied to a plurality of channels in the normal-mounting mode.

Referring to FIG. 8, the first data lines driving circuit part DIC1 includes a first shift register 710, a first serial-to-semi-parallel converting part 730, a first latch 750 (a digital storage latch having a number K of word storing locations), a first digital-to-analog converting part 770 and a first analog buffer 790, and the second data lines driving circuit part DIC2 includes a second shift register 810, a second serial-to-semi-parallel converting part 830, a second latch 850 (a K words wide storage buffer like 750), a second digital-to-analog converting part 870 and a second analog buffer 890.

The first serial-to-semiparallel converting part 730 receives a first image data serial portion DATA1 of the fully serialized image data DATA from line 571 and during a corresponding serial receive time, and converts the received first image data DATA1 to respective parallel data words DATA11, . . . , DATA1*k*, each of a predetermined word length, and outputs the parallel data words DATA11, . . . , DATA1*k* one after the other for storage in store-enabled word locations of latch 750.

The first shift register 710 sequentially provides location-store enable signals En11 to En1*k* to corresponding storage locations of the first latch 750 in synchronism with a system clock and in synchronism with receipt of an STH token signal so as to thereby determine which ones of the sequentially output parallel data signals DATA11, . . . , DATA1*k* will be output from respective storage locations of the K-words wide first latch 750 and thereby applied to the DAC 770 for conversion into corresponding analog signals.

More specifically, the first shift register 710 sequentially outputs activated enable signals En11, . . . , En1*k* one at a time from the first enable signal En11 to the last enable signal En1*k*, and thus sequentially causes storage of the sequentially output parallel data signals, DATA11, . . . , DATA1*k* into respective word-storing locations of the first latch 750, in other words, from the first parallel data word DATA11 to the last parallel data word DATA1*k* as they are sequentially output by the first serial-to-parallel converting part 730.

Thus, in the normal-mounting mode (depicted by FIG. 8), the first shift register 710 causes sequential storage of the parallel data signals, DATA11, . . . , DATA1*k* into the first latch 750 in accordance with a first word storage direction whereby the first parallel data signal DATA11 (e.g., corresponding to R1C1) is applied to a first data channel DC11 on the left and the last parallel data signal DATA1*k* is applied to a last data channel DC1*k* on the right.

The first latch 750 then outputs the so-ordered and stored parallel data signals DATA11, . . . , DATA1*k* to the first digital-to-analog converting part 770, and the first digital-to-analog converting part 770 converts the parallel data words DATA11, . . . , DATA1*k* received from the first latch 750 to analog data signals and outputs these analog data signals to the first analog buffer 790.

The first buffer 790 outputs the analog data signals to the corresponding data channels DC11, . . . , DC1*k* so that the analog data are applied to the data lines DL11, . . . , DL1*k* of the display panel 510.

After controlling the direction in which the parallel data signals, DATA11, . . . , DATA1*k* are stored into the first latch 750, the first shift register 710 provides the data start token signal STH to the second shift register 810 of the second data lines driving circuit part DIC2, and the second data lines driving circuit part DIC2 is then driven in response to the data start signal STH.

A driving operation of the second data lines driving circuit part DIC2 is substantially the same as the driving operation of the first data lines driving circuit part DIC1, and thus further repetitive detailed explanation concerning the second data lines driving circuit part DIC2 will be omitted except to say here that the DATA2 signals are picked up from the serial DATA bus 571' during a predetermined time slot corresponding to data lines DL21 through DL2*k*.

FIG. 9 is a block diagram illustrating the first data lines driving circuit part and the second data lines driving circuit part for explaining the output sequence of the image data applied to the plurality of channels when in the inverted-mounting mode. In FIG. 9, block D1Cm is shown on the right and next block D1C(m−1) is shown on the left. The LSD serial data on bus 571' may be viewed as traveling in a right to left direction for purpose of easier understanding although such travel direction is an artifice because each serial bit appears in its turn along the entire length of bus 571'.

Referring to FIG. 9, the second serial-to-semiparallel converting part 830 receives the first image data DATA1 of the serial image data DATA provided on serial line 571", converts the first image data signals DATA1 to parallel data word signals DATA11, . . . , DATA1*k*, and outputs the parallel data words DATA11, . . . , DATA1*k* for storage in addressable word storage areas of digital data latch 850'.

The second shift register 810' sequentially provides the STH token signal in right to left sequence this time so as to thereby cause the parallel data words DATA11, . . . , DATA1*k* to be stored into the second latch 850 in accordance with the right to left shifting of the data start token signal STH.

For example, the second shift register 810' sequentially outputs enable signals En11, . . . , En1*k* from the first enable signal En11 to the last enable signal En1*k* in right-to-left order, and thus sequentially stores the parallel data words DATA11, . . . , DATA1*k* to the second latch 850' from the first parallel data word DATA11 to the last parallel data word DATA1*k* according to the illustrated right-to-left order.

Thus, in the inverted-mounting mode, the second shift register 810' causes sequential storage of the parallel data words DATA11, . . . , DATA1*k* to the second latch 850' from the first parallel data DATA11 being thus applied to a first data channel DC21 on the right to the last parallel data DATA1*k* being applied to a last data channel DC2*k* on the left.

The second latch 850' outputs the stored parallel data signals DATA11, . . . , DATA1*k* to the second digital-to-analog converting part 870, and the second digital-to-analog converting part 870' converts the parallel data signals DATA11, . . . , DATA1*k* received from the second latch 850' to analog data and outputs the analog data to the second buffer 890'.

The second buffer 890' outputs the analog data to the data channels DC21 (on the right), . . . , DC2*k* (on the left) so that the analog data are applied to the inversely disposed data lines DL21 (on the left), . . . , DL2*k* (on the right) of the display panel 510.

The second shift register 810' provides the data start signal STH to the first shift register 710' of the first data lines driving circuit part DICm, and the first data lines driving circuit part DIC(m−1) is driven in response to the data start signal STH.

A driving of the first data lines driving circuit part DIC(m−1) is substantially the same as the driving of the second data lines driving circuit part DICm, and thus further repetitive detailed explanation concerning the first data lines driving circuit part DIC(m−1) will be omitted.

In a case that the first data lines driving circuit part DICm includes a first port applying odd-numbered image data of the first image data DATA1 to odd-numbered data channels of the data channels DC11, . . . , DC1*k* and a second port applying even-numbered image data of the first image data DATA1 to even-numbered data channels of the data channels DC11, . . . , DC1*k*, an output sequence of the odd-numbered image data applied to the odd-numbered data channels and that of the even-numbered image data applied to the even-numbered data channels may be switched with each other, in the inverted-mounting mode.

The timing control part 570 may include a control data structure 585 (e.g., PROM) for storing a parameter controlling the data lines driving part 550 and the image data DATA, depending on the normal-mounting mode or the inverted-mounting mode.

Figures 10, 11A:
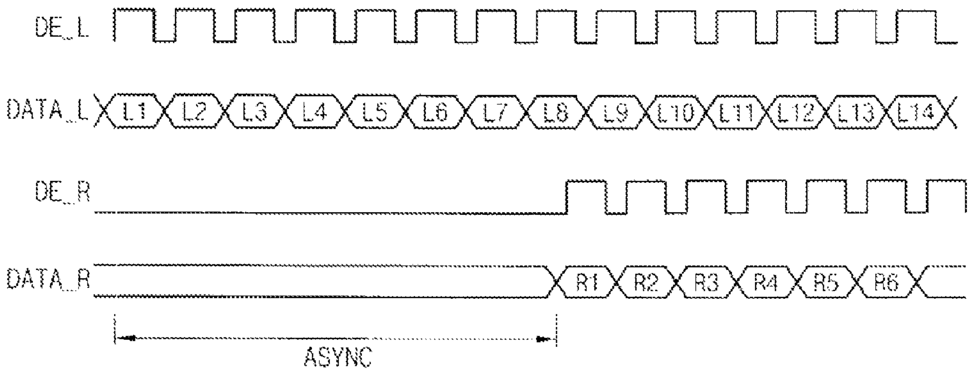
FIG. 10 is a block diagram illustrating a storing part of FIG. 7.
FIG. 11A is an waveform diagram for explaining an asynchronous period between the image data applied to the timing control part by a first frame rate control (FRC) chip and the image data applied to the timing control part by a second FRC chip.

FIG. 10 is a block diagram illustrating a control data structure 585 stored in a storing part of FIG. 7.

Referring to FIG. 10, the control data structure 585 may include a first control field, 'A/B Gamma swap' used for controlling switching respective look-up tables of a main pixel and a sub pixel with each other when each of the pixels has the main pixel and the sub pixel. It may include a second control field, 'Pol. swap' used for controlling switching polarities of the image data DATA with each other. It may include a third control field, 'AiPi Lane swap' used for controlling of switching an odd-numbered port and an even-numbered port with each other. It may include a fourth control field, 'Data order swap' used for controlling an exchanging a sequence of the image DATA in a bit unit, and a fifth control field, 'D-IC order swap' used for controlling an exchanging of the latch sequence of the data lines driving circuit parts DIC1, DIC2, . . . , DICm. It may include a sixth control field, 'RGB swap' used for controlling an exchanging of a sequence of the image DATA in an RGB unit, a seventh control field, 'O/E line swap' used for controlling switching of data of an odd-numbered channel and data of an even-numbered channel with each other, and an eighth control field, 'O/E pixel swap' used for controlling switching of data of an odd-numbered pixel and data of an even-numbered pixel with each other.

The timing control part 570 controls the data lines driving part 550 and the image data DATA using at least one of the parameters stored in the control data structure 585, depending on the normal-mounting mode or the inverted-mounting mode.

As seen in FIG. 7, the gate lines driving part 530 includes a first gate lines driving circuit part GIC1, a second gate lines driving circuit part GIC2, . . . , an n-th gate lines driving circuit part GICn.

An output sequence of the gate lines driving circuit parts GIC1, GIC2, . . . , GICn is controlled differently, depending on whether the gate lines driving part 530 receives the normal-mounting mode signal USD or the inverted-mounting mode signal LSD.

When the gate lines driving part 530 receives the normal-mounting mode signal USD, the gate lines driving circuit parts GIC1, GIC2, . . . , GICn sequentially output gate signals from the first gate lines driving circuit part GIC1 to the n-th driving circuit part GICn in the recited order. When the gate lines driving part 530 receives the inverted-mounting mode signal LSD, the gate lines driving circuit parts GIC1, GIC2, . . . , GICn sequentially output gate signals from the n-th driving circuit part GICn to the first gate lines driving circuit part GIC1 according to the latter recited order.

When the gate lines driving part 530 receives the inverted-mounting mode signal LSD, the gate lines driving part 530 applies a dummy gate signal to at least one of dummy gate lines DGL1, DGL2, . . . , DGLn adjacent to the last gate line GLni of the gate lines GL11, . . . , GL1*i*, GL21, . . . , GL2*i*, . . . , GLn1, . . . , GLni, before the n-th gate lines driving circuit part GICn is driven. The gate lines driving part 530 may include a dummy gate lines driving circuit part DGIC applying dummy gate signals to the dummy gate lines DGL1, DGL2, . . . , DGLn.

Generally, two frame rate control (FRC) chips are used so that the timing control part 570 receives the image data DATA from the outside of the display apparatus 100, and an asynchronous skew-adjusting period occurs between the two FRC chips.

The gate lines driving part 530 applies the dummy gate signals to the dummy gate lines DGL1, DGL2, . . . , DGLn during the asynchronous period.

Figure 11B:
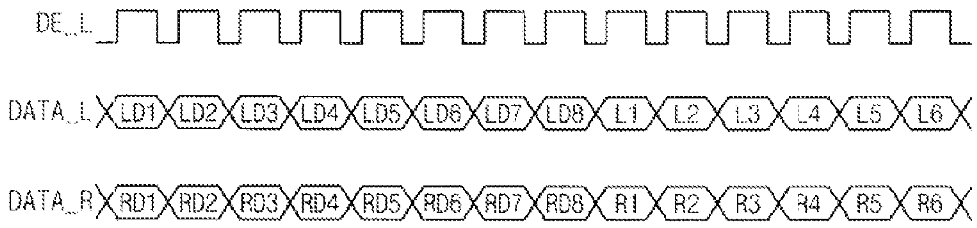
FIG. 11B is an waveform diagram for explaining dummy gate signals applied to dummy gate lines using the asynchronous period of FIG. 11A.

FIG. 11A is an waveform timing diagram for explaining an asynchronous period between the image data applied to the timing control part by a first frame rate control (FRC) chip and the image data applied to the timing control part by a second FRC chip, and FIG. 11B is an waveform timing diagram for explaining dummy gate signals applied to dummy gate lines using the asynchronous period of FIG. 11A.

Referring to FIG. 11A, the starting valid data word L1 of first image data DATA_L stream used by the first FRC chip and starting data word R1 of second image data DATA_R stream used by the second FRC chip are received at times different from each other. Thus, an asynchronous skew period ASYNC generally occurs between the first image data DATA_L and the second image data DATA_R.

Referring to FIG. 11B, the time of the start data L1 of the delayed first image data stream DATA_L is delayed and shifted to align with that of the start data R1 of the second image data DATA_R so that the first image data DATA_L and the second image data DATA_R are thereby synchronized with each other.

Thus, dummy gate signals LD1, DL2, . . . , LD8, RD1, RD2, . . . , RD8 may be applied to the dummy gate lines DGL1, DGL2, . . . , DGLn in the asynchronous period ASYNC.

When the gate lines driving part 530 receives the inverted-mounting mode signal LSD, the n-th gate lines driving circuit part GICn firstly responds to the gate start signal STV so that the n-th gate lines driving circuit part GICn of the gate lines driving circuit parts GIC1, GIC2, . . . , GICn is driven for the first time.

Figure 12:
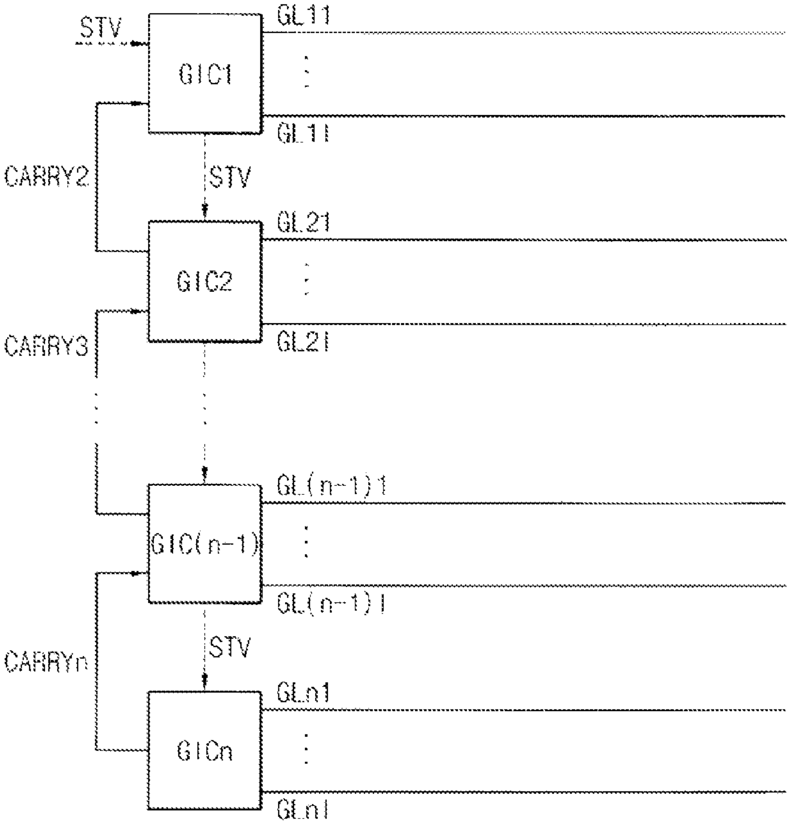
FIG. 12 is a conceptual diagram illustrating a process of which an n-th gate lines driving circuit part that is a last gate lines driving circuit part first responds prior to response of remaining gate lines driving circuit parts.

FIG. 12 is a conceptual diagram illustrating a process of which an n-th gate lines driving circuit part that is a last gate lines driving circuit part first responds prior to response of remaining gate lines driving circuit parts.

Referring to FIG. 12, each of the gate lines driving circuit parts GIC1, GIC2, . . . , GIC(n−1) except for the n-th gate lines driving circuit part GICn receiving the gate start signal STV from the previous gate lines driving circuit part, does not respond to the gate start signal STV and transfers the gate start signal STV to the next gate lines driving circuit part.

When the gate start signal STV is transferred to the n-th gate lines driving circuit part GICn, the n-th gate lines driving circuit part GICn transfers gate signals to the gate lines GLn1, . . . , GLn1 connected to the n-th gate lines driving circuit part GICn in response to the gate start signal STV.

When the n-th gate lines driving circuit part GICn outputs the gate signals, the n-th gate lines driving circuit part GICn outputs an n-th carry signal CARRYn, and each of the (n−1)-th to the first gate lines driving circuit parts GIC(n−1), . . . , GIC1 is driven in response to a carry signal outputted from the following gate lines driving circuit part. For example, the (n−1)-th gate lines driving circuit part GIC(n−1) may be driven in response to the n-th carry signal CARRYn outputted from the n-th gate lines driving circuit part GICn, and the first gate lines driving circuit part GIC1 may be driven in response to a second carry signal CARRY2 outputted from the second gate lines driving circuit part GIC2.

Therefore, when a reverse image is displayed on the display panel 510, a physical line transferring the initially provided gate start signal STV may be shortened, and thus heat of the display apparatus 500 may be decreased even though G1Cn will be the first unit activated in response to the initially provided gate start signal STV.

Each of the gate lines driving circuit parts GIC1, GIC2, . . . , GICn may include a plurality of gate channels.

For example, the first gate lines driving circuit part GIC1 may include a first gate channel, a second gate channel, . . . , an (l−1)-th gate channel and an l-th gate channel.

In the normal-mounting mode, the first gate lines driving circuit part GIC1 may sequentially output the gate signals to the gate channels from the first gate channel, the second gate channel, . . . , the (l−1)-th gate channel and the l-th gate channel, and in the inverted-mounting mode, the first gate lines driving circuit part GIC1 may sequentially output the gate signals to the gate channels from the l-th gate channel, the (l−1)-th gate channel, . . . , the second gate channel and the first gate channel.

Figure 13:
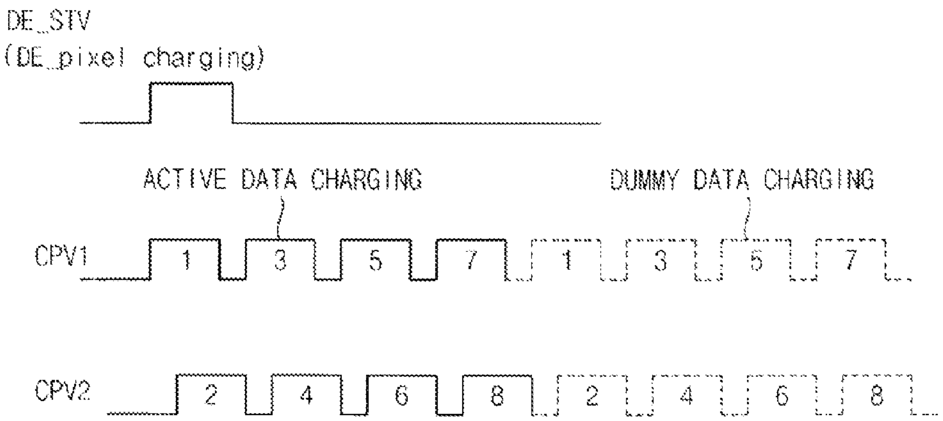
FIG. 13 is a waveform diagram illustrating signals applied to a gate lines driving circuit part and a dummy gate lines driving circuit part in the normal-mounting mode.

FIG. 13 is a waveform timing diagram illustrating signals applied to a gate lines driving circuit part and a dummy gate lines driving circuit part in the normal-mounting mode.

Figure 14:
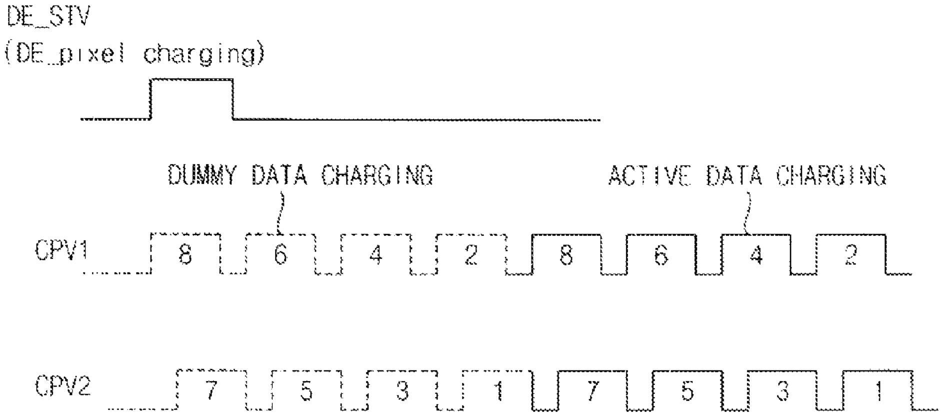
FIG. 14 is a waveform diagram illustrating the signals applied to the gate lines driving circuit part and the dummy gate lines driving circuit part in the inverted-mounting mode.

FIG. 14 is a waveform timing diagram illustrating the signals applied to the gate lines driving circuit part and the dummy gate lines driving circuit part in the inverted-mounting mode.

Figure 15:
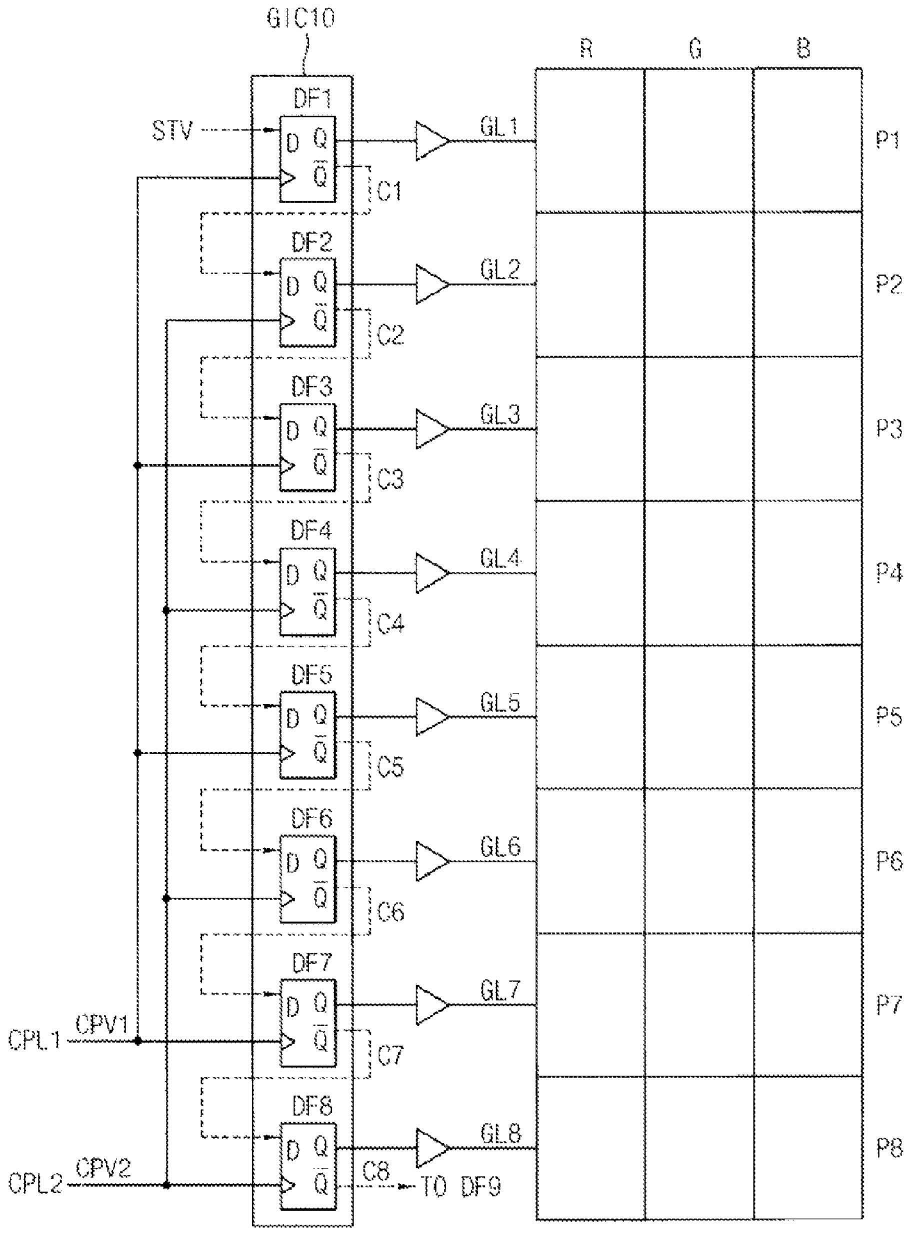
FIG. 15 is a block diagram illustrating the gate lines driving circuit part in the normal-mounting mode as an example embodiment.

FIG. 15 is a block diagram illustrating the gate lines driving circuit part in the normal-mounting mode as an example embodiment.

Figure 16:
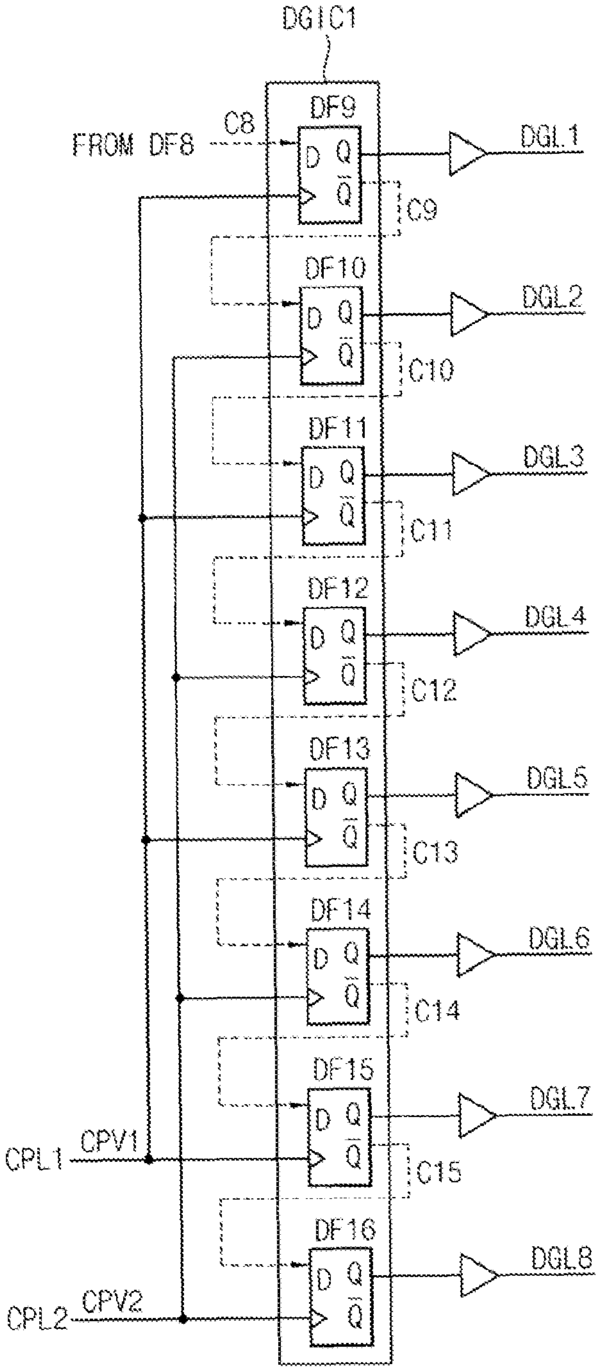
FIG. 16 is a block diagram illustrating the dummy gate lines driving circuit part in the normal-mounting mode as an example embodiment.

FIG. 16 is a block diagram illustrating the dummy gate lines driving circuit part in the normal-mounting mode as an example embodiment.

Figure 17:
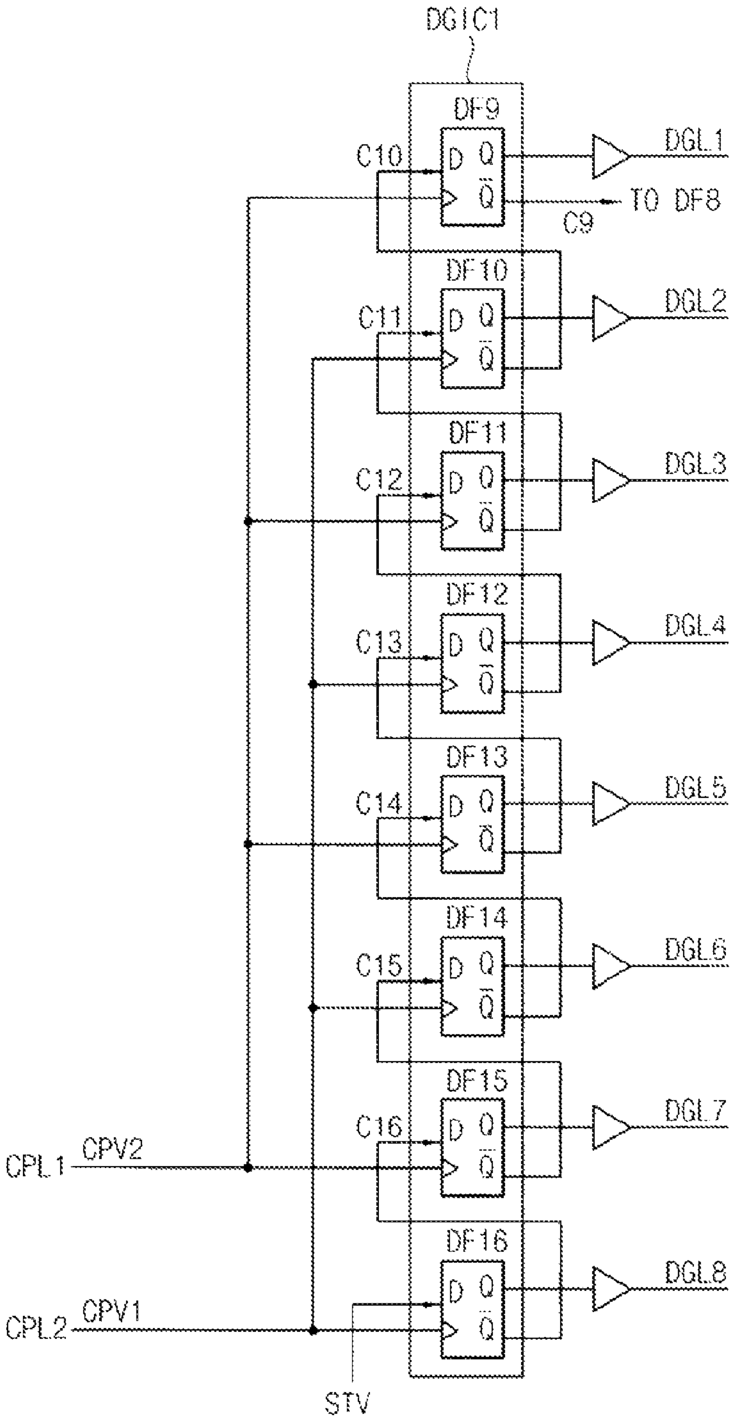
FIG. 17 is a block diagram illustrating the dummy gate lines driving circuit part in the inverted-mounting mode as an example embodiment.

FIG. 17 is a block diagram illustrating the dummy gate lines driving circuit part in the inverted-mounting mode as an example embodiment.

Figure 18:
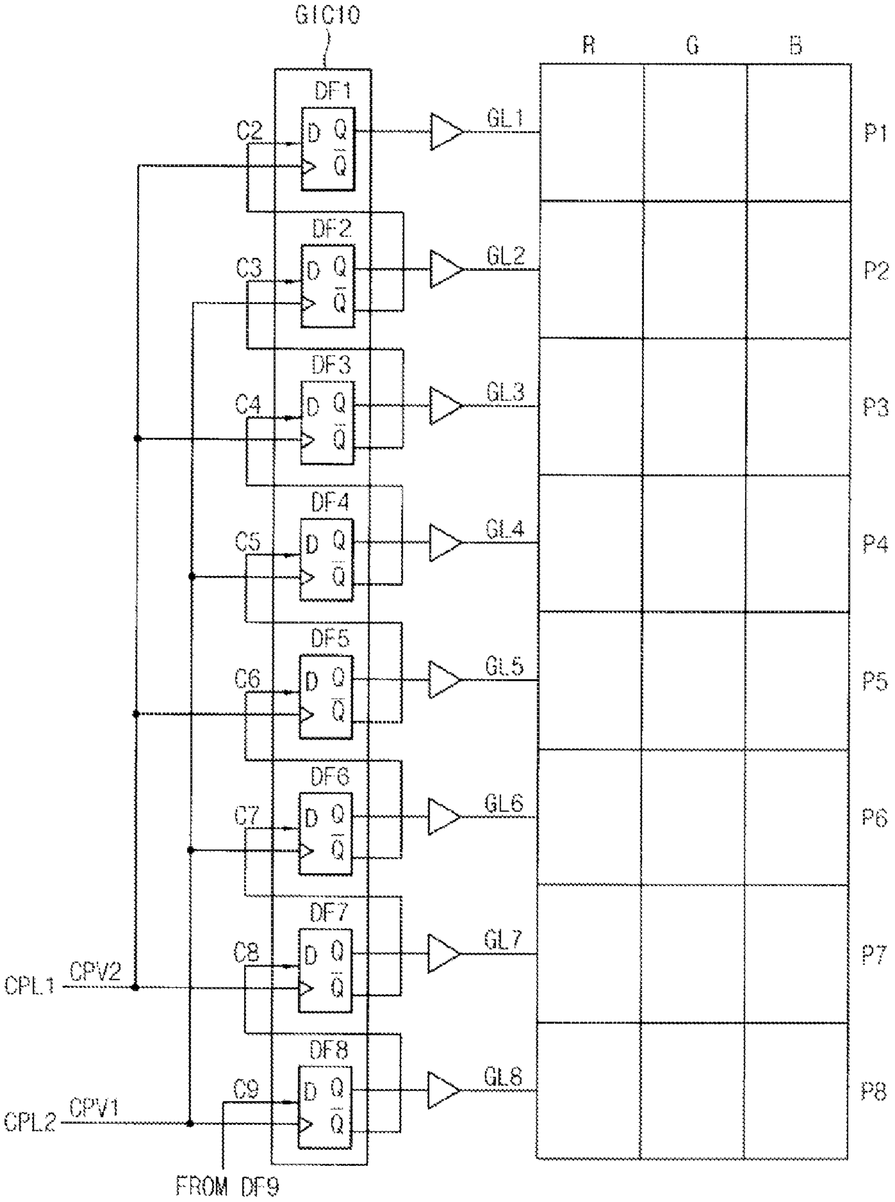
FIG. 18 is a block diagram illustrating the gate lines driving circuit part in the inverted-mounting mode as an example embodiment.

FIG. 18 is a block diagram illustrating the gate lines driving circuit part in the inverted-mounting mode as an example embodiment.

Referring to FIGS. 13 and 15, a gate lines driving circuit part GIC10 according to present example embodiment includes a first flip-flop DF1, a second flip-flop DF2, a third flip-flop DF3, a fourth flip-flop DF4, a fifth flip-flop DF5, a sixth flip-flop DF6, a seventh flip-flop DF7 and an eighth flip-flop DF8.

The gate lines driving circuit part GIC10 may be one of the gate lines driving circuit parts GIC1, GIC2, . . . , GICn in FIG. 7.

For convenience of description, the gate lines driving circuit part GIC10 in FIG. 15 includes eight flip-flops, but the gate lines driving circuit part GIC10 may include a plurality of flip-flops depending on the number of gate lines connected to the gate lines driving circuit part GIC10.

In the normal-mounting mode, a first clock pulse CPV1 is applied to a first clock pulse line CPL1 and a second clock pulse CPV2 is applied to a second clock pulse line CPL2.

The first flip-flop DF1 receives the gate start signal STV and outputs a first gate signal to a first gate line GL1 connected to a first pixel P1 in response to a first pulse of the first clock pulse CPV1. When the first flip-flop DF1 outputs the first gate signal, the first flip-flop DF1 outputs a first carry signal C1 to the second flip-flop DF2.

The second flip-flop DF2 receives the first carry signal C1 from the first flip-flop DF1 and outputs a second gate signal to a second gate line GL2 connected to a second pixel P2 in response to the first carry signal C1 and a first pulse of the second clock pulse CPV2. When the second flip-flop DF2 outputs the second gate signal, the second flip-flop DF2 outputs a second carry signal C2 to the third flip-flop DF3.

In the same manner like the second flip-flop DF2, the third to eighth flip-flops sequentially receive a carry signal from a previous flip-flop, and output third to eighth gate signals to third to eighth gate lines GL3, GL4, . . . , GL8 in response to the first clock pulse CPV1 and the second clock pulse CPV2.

When the eighth flip-flop DF8 output the eighth gate signal, the eighth flip-flop DF8 outputs an eighth carry signal C8 to a first flip-flop of a dummy gate lines driving circuit part disposed next to the eighth flip-flop DF8.

Referring to FIGS. 13 and 16, a dummy gate lines driving circuit part DGIC1 according to the example embodiment includes a ninth flip-flop DF9, a tenth flip-flop DF10, an eleventh flip-flop DF11, a twelfth flip-flop DF12, a thirteenth flip-flop DF13, a fourteenth flip-flop DF14, a fifteenth flip-flop DF15 and a sixteenth flip-flop DF16.

For convenience of description, the dummy gate lines driving circuit part DGIC1 in FIG. 16 includes eight flip-flops, but the dummy gate lines driving circuit part DGIC1 may include a different number of plural flip-flops depending on the number of dummy gate lines connected to the dummy gate lines driving circuit part DGIC1.

In the normal-mounting mode, the first clock pulse CPV1 is applied to the first clock pulse line CPL1 and the second clock pulse CPV2 is applied to the second clock pulse line CPL2.

The ninth flip-flop DF9 receives the eighth carry signal C8 from the eighth flip-flop DF8 in FIG. 15, and outputs a first dummy gate signal to a first dummy gate line DGL1 in response to the eighth carry signal C8 and a fifth pulse of the first clock pulse CPV1. When the ninth flip-flop DF9 outputs the first dummy gate signal, the ninth flip-flop DF9 outputs a ninth carry signal to the tenth flip-flop DF10.

The tenth flip-flop DF10 receives the ninth carry signal C9 from the ninth flip-flop DF9 and outputs a second dummy gate signal to a second dummy gate line GL2 in response to the ninth carry signal C9 and a fifth pulse of the second clock pulse CPV2.

In the same manner like the tenth flip-flop DF10, the eleventh to sixteenth flip-flops DF11, DF12, DF13, DF14, DF15 and DF16 sequentially receive a carry signal from a previous flip-flop and outputs third through eighth dummy gate signals to third through eighth dummy gate lines DGL3, DGL4, . . . , DGL8 in response to the first clock pulse CPV1 and the second clock pulse CPV2.

Referring to FIGS. 14 and 17, in the inverted-mounting mode, the second clock pulse CPV2 is applied to the first clock pulse line CPL1, and the first clock pulse CPV1 is applied to the second clock pulse line CPL2.

The sixteenth flip-flop DF16 receives the gate start signal STV and outputs the eighth dummy gate signal to the eighth dummy gate line DGL8 in response to a first pulse of the first clock pulse CPV1. When the sixteenth flip-flop DF16 outputs the eighth dummy gate signal, the sixteenth flip-flop DF16 outputs a sixteenth carry signal C16 to the fifteenth flip-flop DF15.

The fifteenth flip-flop DF15 receives the sixteenth carry signal C16 from the sixteenth flip-flop DF16 and outputs the seventh dummy gate signal to the seventh dummy gate line in response to a first pulse of the second clock pulse CPV2. When the fifteenth flip-flop DF15 outputs the seventh dummy gate signal, the fifteenth flip-flop DF15 outputs a fifteenth carry signal C15 to the fourteenth flip-flop DF14.

In the same manner like the fifteenth flip-flop DF15, the fourteenth through ninth flip-flops DF14, DF13, DF12, DF11, DF10 and DF9 sequentially receive a carry signal from a next flip-flop and outputs sixth through first dummy gate signals to sixth to first dummy gate lines DGL6, DGL5, DGL4, DGL3, DGL2 and DGL1 in response to the first clock pulse CPV1 and the second clock pulse CPV2.

Referring to FIGS. 14 and 18, in the inverted-mounting mode, the second clock pulse CPV2 is applied to the first clock pulse line CPL1 and the first clock pulse CPV1 is applied to the second clock pulse line CPL2.

The eighth flip-flop DF8 receives the ninth carry signal C9 from the ninth flip-flop DF9 in FIG. 17 and outputs the eighth gate signal to the eighth gate line GL8 connected to the eighth pixel P8 in response to the ninth carry signal C9 and a fifth pulse of the first clock pulse CPV1. When the eighth flip-flop DF8 outputs the eighth gate signal, the eighth flip-flop DF8 outputs an eighth carry signal C8 to the seventh flip-flop DF7.

The seventh flip-flop DF7 receives the eighth carry signal C8 from the eighth flip-flop DF8 and outputs the seventh gate signal to the seventh gate line GL7 connected to the seventh pixel P7 in response to the eighth carry signal C8 and a fifth pulse of the second clock pulse CPV2.

In the same manner like the seventh flip-flop DF7, the sixth to first flip-flops DF6, DF5, DF4, DF3, DF2 and DF1 sequentially receive a carry signal from a next flip-flop and outputs sixth through first gate signals to sixth through first gate lines GL6, GL5, . . . , GL1 in response to the first clock pulse CPV1 and the second clock pulse CPV2.

Clock pulses different from each other are respectively applied to the first clock pulse line CPL1 and the second clock pulse line CPL2, depending on whether the normal-mounting mode or the inverted-mounting mode is selected.

A selector may be disposed in a front of the first and second clock pulse lines CPL1 and CPL2 so that the clock pulses different from each other are respectively applied to the first and second clock pulse lines CPL1 and CPL2 depending on the normal-mounting mode or the inverted-mounting mode selection.

Figure 19A:
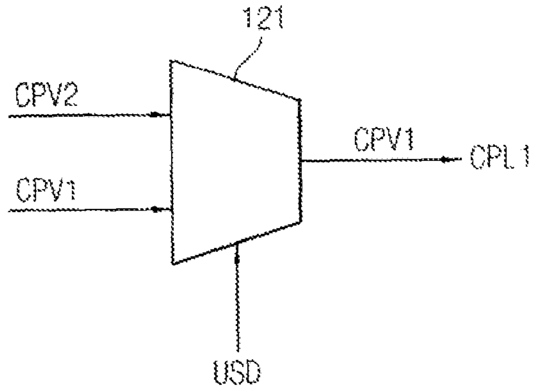
FIG. 19A is a circuit diagram illustrating a selector disposed in a front of a first clock pulse line in the normal-mounting mode.

FIG. 19A is a circuit diagram illustrating a selector disposed in a front of a first clock pulse line in the normal-mounting mode.

Referring to FIG. 19A, a first selector (multiplexer) 121 disposed in the front of the first clock pulse line CPL1 outputs the first clock pulse CPV1 of the first and second clock pulses CPV1 and CPV2 applied to the first selector 121 in response to the normal-mounting mode signal USD.

Figure 19B:
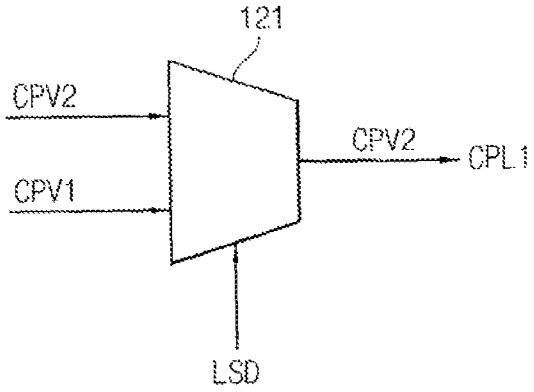
FIG. 19B is a circuit diagram illustrating a selector disposed in the front of the first clock pulse line in the inverted-mounting mode.

FIG. 19B is a circuit diagram illustrating a selector disposed in the front of the first clock pulse line in the inverted-mounting mode.

Referring to FIG. 19B, the first selector 121 disposed in the front of the first clock pulse line CPL1 outputs the second clock pulse CPV2 of the first and second clock pulses CPV1 and CPV2 applied to the first selector 121 in response to the inverted-mounting mode signal LSD.

Figure 19C:
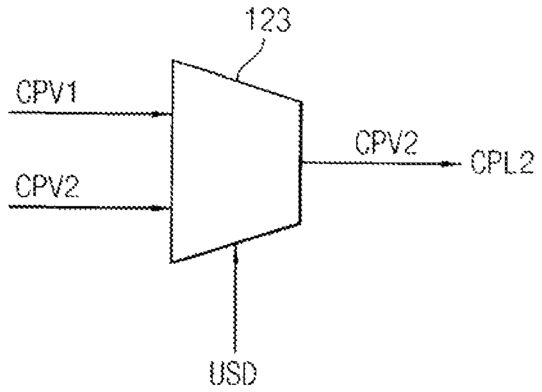
FIG. 19C is a circuit diagram illustrating a selector disposed in the front of a second clock pulse line in the normal-mounting mode.

FIG. 19C is a circuit diagram illustrating a selector (multiplexer) disposed in the front of a second clock pulse line in the normal-mounting mode.

Referring to FIG. 19C, a second selector 123 disposed in the front of the second clock pulse line CPL2 outputs the second clock pulse CPV2 of the first and second clock pulses CPV1 and CPV2 applied to the second selector 123 in response to the normal-mounting mode signal USD.

Figure 19D:
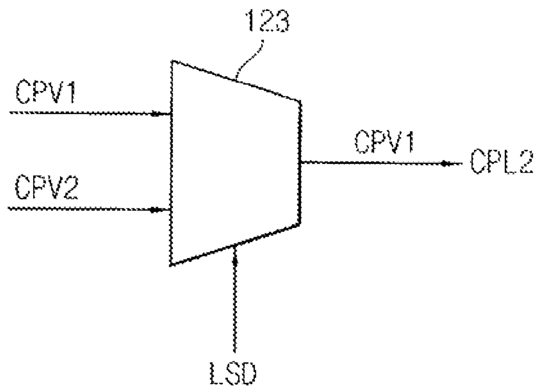
FIG. 19D is a circuit diagram illustrating a selector disposed in the front of the second clock pulse line in the inverted-mounting mode.

FIG. 19D is a circuit diagram illustrating a selector disposed in the front of the second clock pulse line in the inverted-mounting mode.

Referring to FIG. 19D, a second selector 123 disposed in the front of the second clock line CPL2 outputs the first clock pulse CPV1 of the first and second clock pulses CPV1 and CPV2 applied to the second selector 123 in response to the inverted-mounting mode signal LSD.

Figure 20:
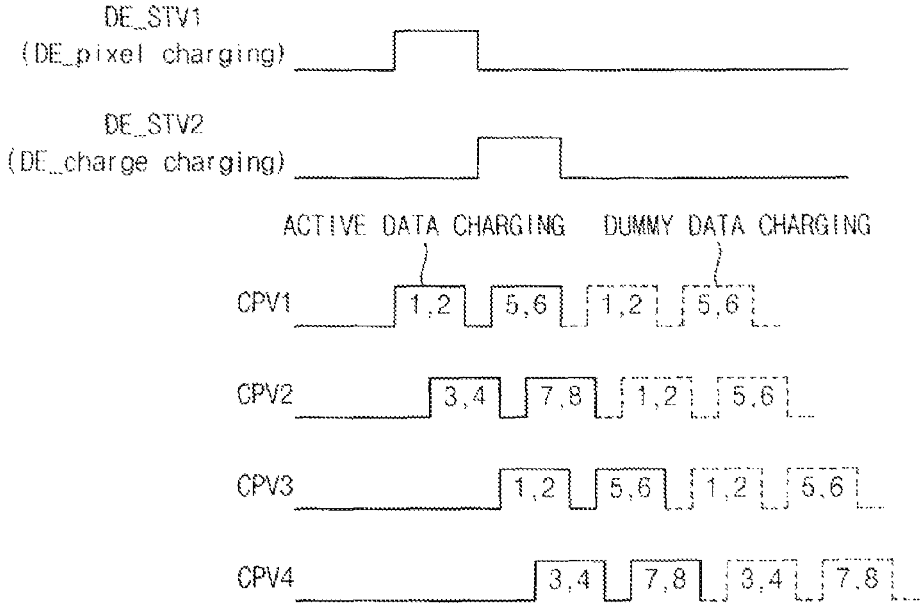
FIG. 20 is a waveform diagram illustrating signals applied to the gate lines driving circuit part and the dummy gate lines driving circuit part in the normal-mounting mode.

FIG. 20 is a waveform timing diagram illustrating signals applied to the gate lines driving circuit part and the dummy gate lines driving circuit part in the normal-mounting mode.

Figure 21:
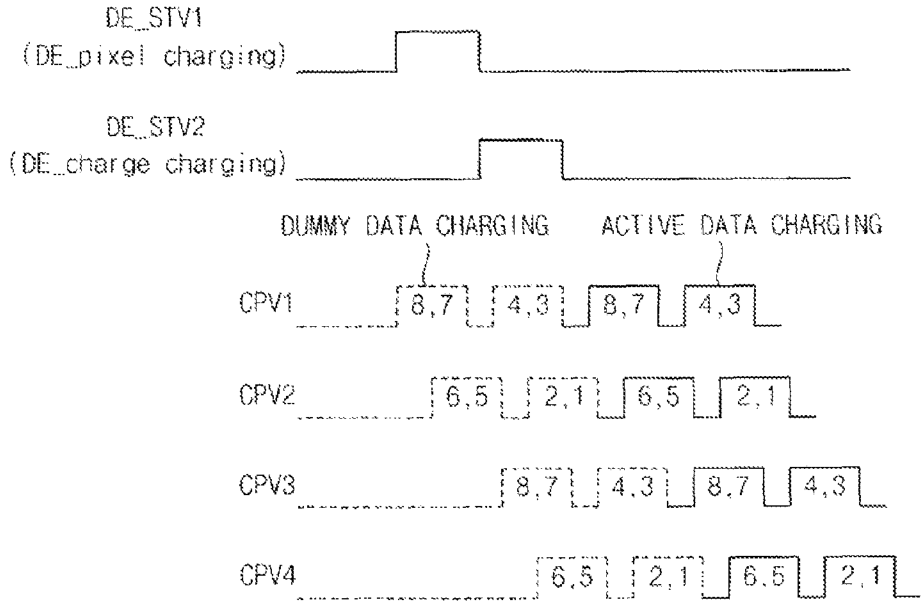
FIG. 21 is a waveform diagram illustrating the signals applied to the gate lines driving circuit part and the dummy gate lines driving circuit part in the inverted-mounting mode.

FIG. 21 is a waveform timing diagram illustrating the signals applied to the gate lines driving circuit part and the dummy gate lines driving circuit part in the inverted-mounting mode.

Figure 22:
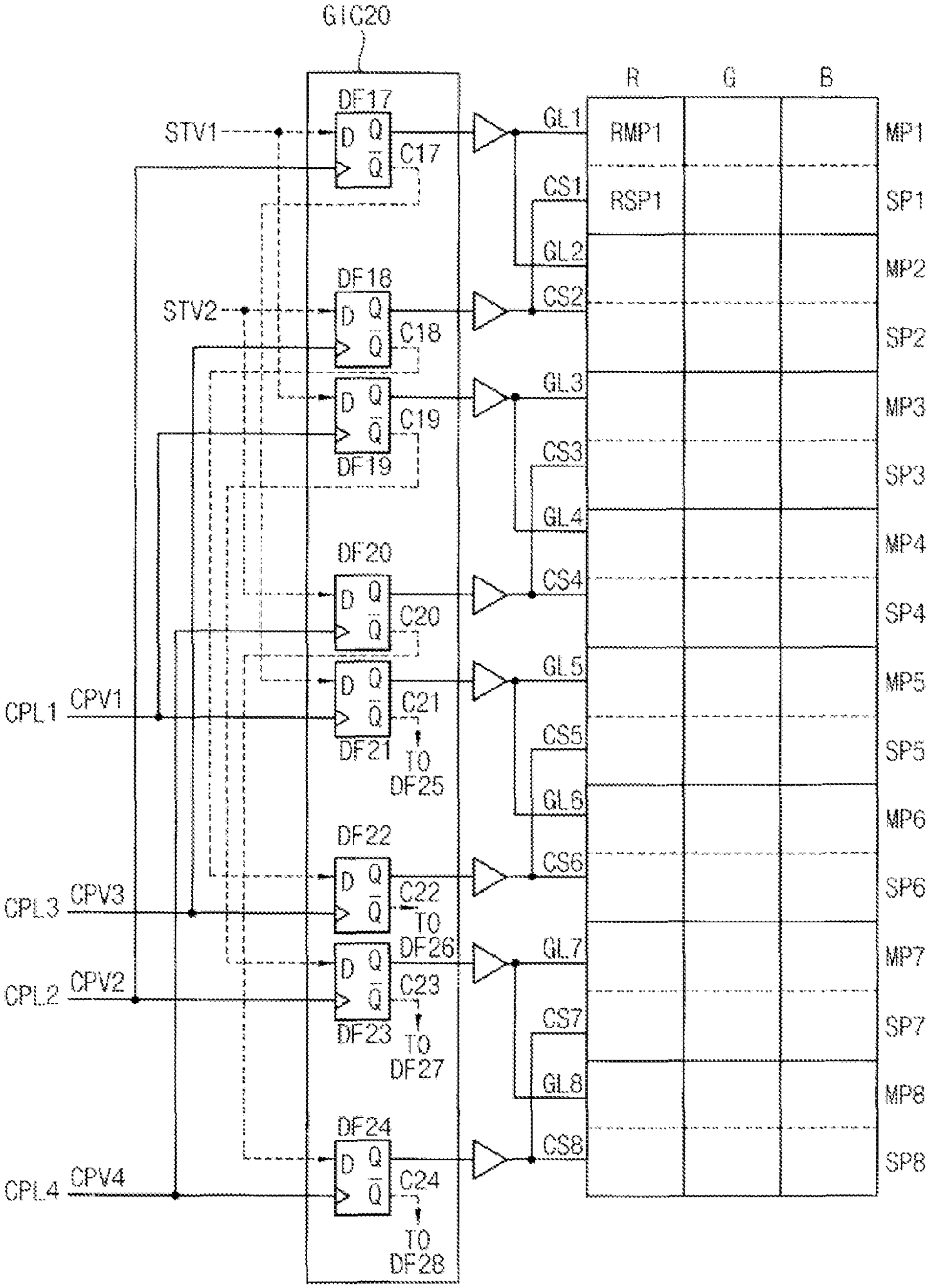
FIG. 22 is a block diagram illustrating a gate lines driving circuit part in the normal-mounting mode as an example embodiment.

FIG. 22 is a block diagram illustrating a gate lines driving circuit part in the normal-mounting mode as an example embodiment.

Figure 23:
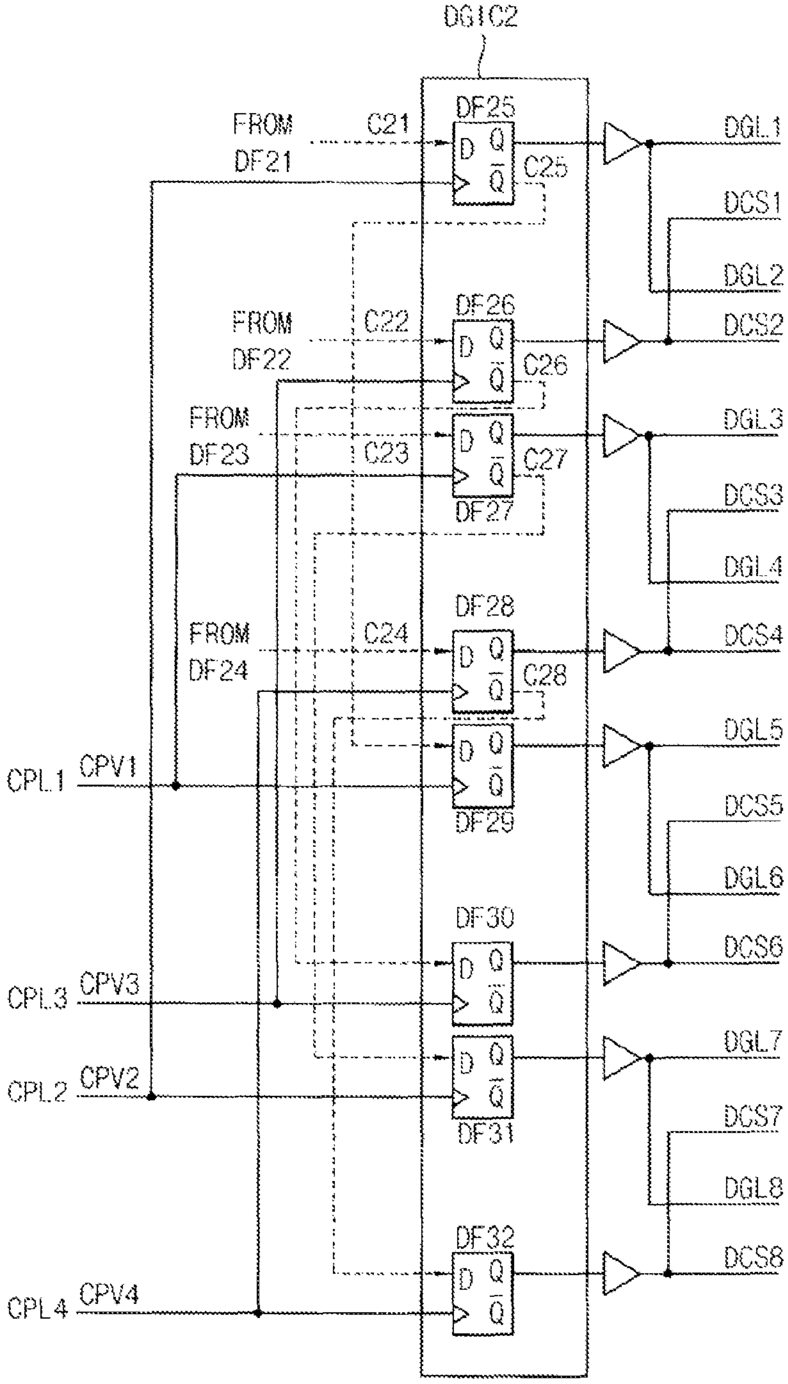
FIG. 23 is a block diagram illustrating a dummy gate lines driving circuit part in the normal-mounting mode as an example embodiment.

FIG. 23 is a block diagram illustrating a dummy gate lines driving circuit part in the normal-mounting mode as an example embodiment.

Figure 24:
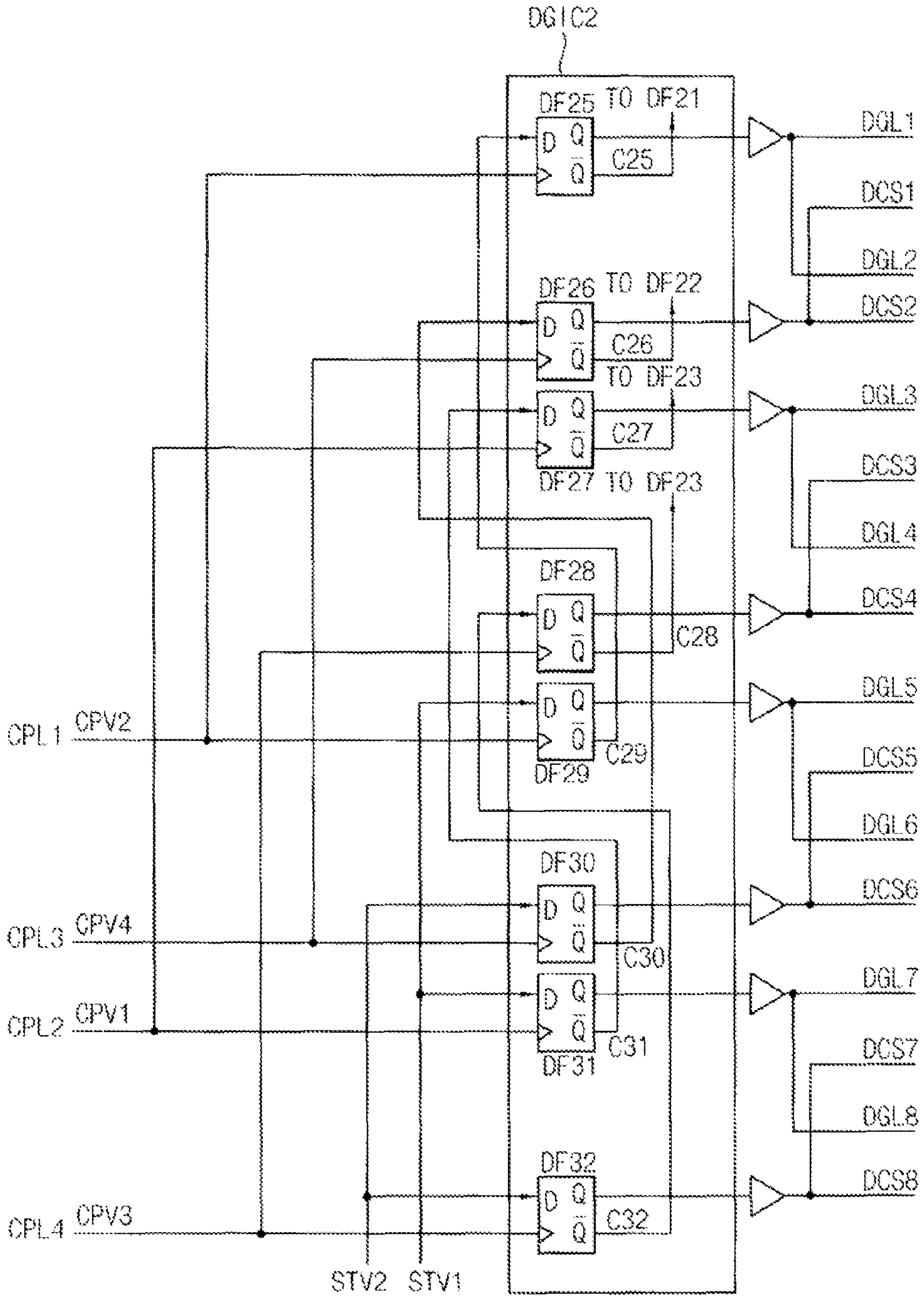
FIG. 24 is a block diagram illustrating the gate lines driving circuit part in the inverted-mounting mode as an example embodiment.

FIG. 24 is a block diagram illustrating the gate lines driving circuit part in the inverted-mounting mode as an example embodiment.

Figure 25:
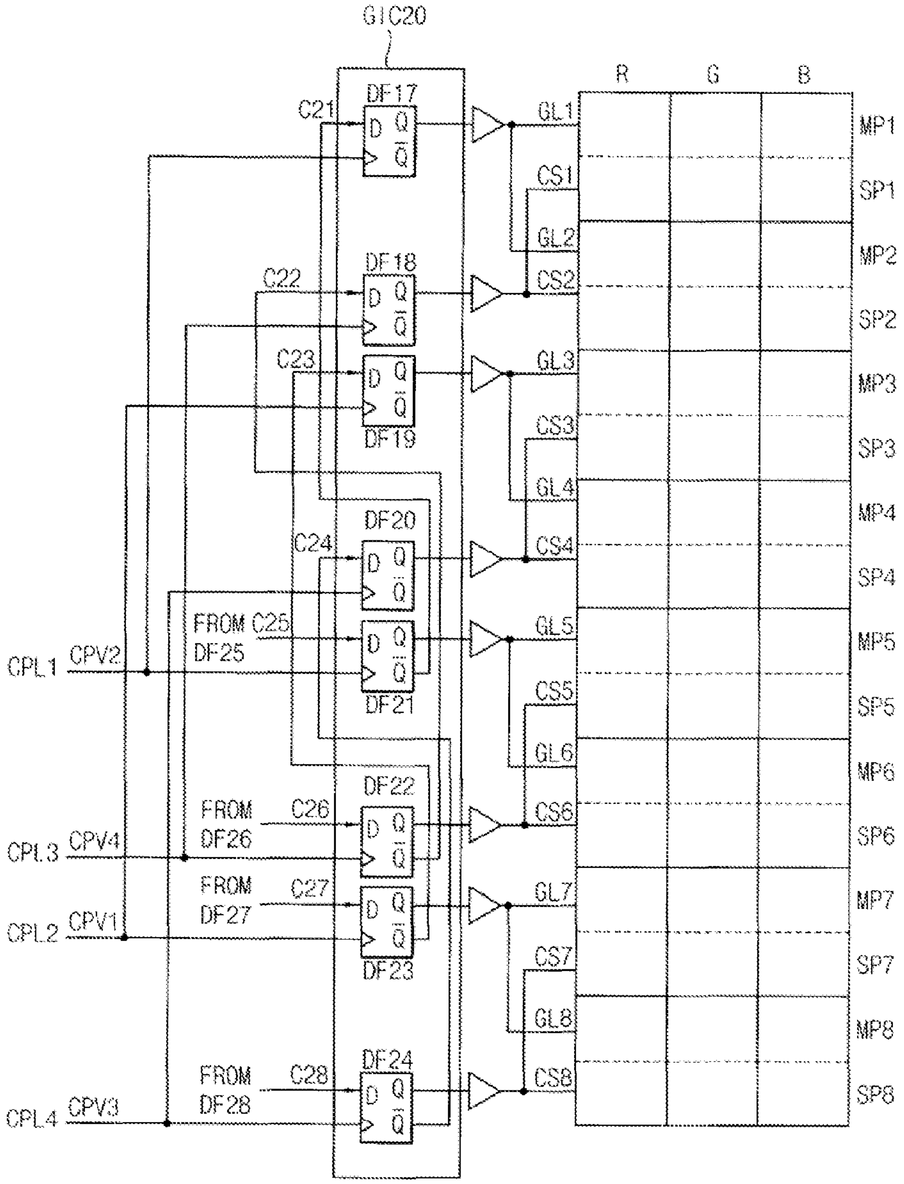
FIG. 25 is a block diagram illustrating the dummy gate lines driving circuit part in the inverted-mounting mode as an example embodiment.

FIG. 25 is a block diagram illustrating the dummy gate lines driving circuit part in the inverted-mounting mode as an example embodiment.

Referring to FIGS. 20 and 22, a gate lines driving circuit part GIC20 according to present example embodiment includes a seventeenth flip-flop DF17, an eighteenth flip-flop DF18, a nineteenth flip-flop DF19, a twentieth flip-flop DF20, a twenty-first flip-flop DF21, a twenty-second flip-flop DF22, a twenty-third flip-flop DF23 and a twenty-fourth flip-flop DF24.

The gate lines driving circuit part GIC20 may be one of the gate lines driving circuit parts GIC1, GIC2, . . . , GICn in FIG. 7.

For convenience of description, the gate lines driving circuit part GIC20 in FIG. 20 includes eight flip-flops, but the gate lines driving circuit part GIC20 may include a plurality of flip-flops depending on the numbers of gate lines and charge sharing lines connected to the gate lines driving circuit part GIC20.

In one embodiment, of FIG. 20, each pixel may include a main pixel electrode and a sub pixel electrode. The main pixel electrode may be connected a TFT connected to a gate line and the sub pixel may be connected a TFT connected to a charge sharing line. (See briefly FIG. 26.) For example, one red pixel may include a first main red pixel RMP1 and a first sub red pixel RSP1. The first main red pixel RMP1 may be connected to a first gate line GL1 and the first sub red pixel RSP1 may be connected a first charge sharing line CS1.

Figure 26:
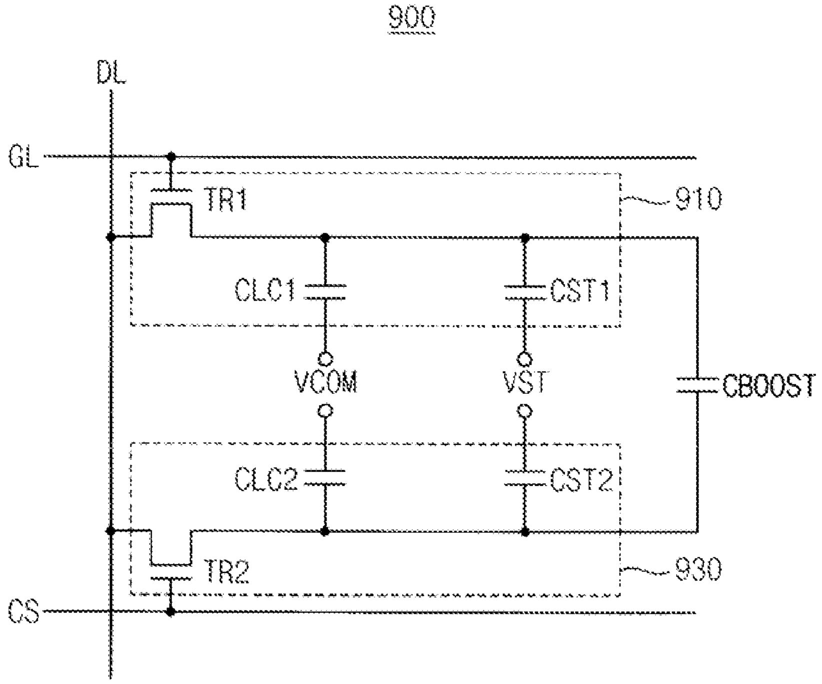
FIG. 26 is a circuit diagram for explaining a sub pixel and a charge sharing line.

FIG. 26 is a circuit diagram for explaining a sub pixel and a charge sharing line.

Referring to FIG. 26, a pixel 900 includes a main pixel 910, a sub pixel 930 and a boost capacitor CBOOST.

The main pixel 910 includes a first thin-film transistor (TFT) TR1, a first liquid crystal capacitor CLC1 and a first storage capacitor CST1, and the sub pixel 930 includes a second TFT TR2, a second liquid crystal capacitor CLC2 and a second storage capacitor CST2.

The first TFT TR1 includes a gate electrode connected to a gate line GL, a source electrode connected to a data line DL and a drain electrode connected to the first liquid crystal capacitor CLC1. The first liquid crystal capacitor CLC1 includes a first electrode connected to the drain electrode of the first TFT TR1 and a second electrode receiving a common voltage VCOM. The first storage capacitor CST1 includes a first electrode connected to the first electrode of the first liquid crystal capacitor CLC1 and a second electrode receiving a storage voltage VST.

The second TFT TR2 includes a gate electrode connected to a charge sharing line CS, a source electrode connected to a data line DL and a drain electrode connected to the second liquid crystal capacitor CLC2. The second liquid crystal capacitor CLC2 includes a first electrode connected to the drain electrode of the second TFT TR2 and a second electrode receiving the common voltage VCOM. The second storage capacitor CST2 includes a first electrode connected to the first electrode of the second liquid crystal capacitor CLC2 and a second electrode receiving the storage voltage VST.

The boost capacitor CBOOST includes a first electrode connected to the drain electrode of the first TFT TR1 and a second electrode connected to the drain electrode of the second TFT TR2.

When a gate signal is applied to the main pixel unit 910 through the gate line GL, the main pixel unit 910 can then receive a first data signal passing through the data line DL in response to the gate signal to be charged with a main pixel voltage.

When a charge sharing signal that is generated following the gate signal and passes through the charge sharing line CS is applied to the sub pixel unit 930, the sub pixel unit 930 can then receive a second data signal passing through the data line DL in response to the charge sharing signal to be charged with a sub pixel voltage.

The boost capacitor CBOOST boosts up the main pixel voltage, when the sub pixel unit 930 is charged with its corresponding sub pixel voltage. Thus, a display apparatus including the pixel 900 may improve a visibility of a side surface of the display apparatus by charging voltages different each other to the main pixel 910 and the sub pixel 930, and may prevent a luminance from being decreased in a high grayscale by boosting up a pixel voltage of the main pixel 910 into a level higher than that of a data signal applied from the data line DL.

Referring now to FIGS. 20 and 22, in the normal-mounting mode, a first clock pulse CPV1 is applied to a first clock pulse line CPL1, a second clock pulse CPV2 is applied to a second clock pulse line CPL2, a third clock pulse CPV3 is applied to a third clock pulse line CPL3, and a fourth clock pulse CPV4 is applied to a fourth clock pulse line CPL4.

The first and second clock pulses CPV1 and CPV2 and a first gate start signal STV1 apply gate signals to gate lines GL1, GL2, . . . , GL8, and the third and fourth clock pulses CPV3 and CPV4 and a second gate start signal STV2 apply charge sharing signals to charge sharing lines CS1, CS2, . . . , CS8.

In the normal-mounting mode, a sequence of which the gate lines driving circuit part GIC20 applies the gate signals to the gate lines GL1, GL2, . . . , GL8 is described, and then a sequence of which the gate lines driving circuit part GIC20 applies the charge sharing signals to the charge sharing lines CS1, CS2, . . . , CS8 is described.

In the normal-mounting mode, the seventeenth flip-flop DF17 receives the first gate start signal STV1 and outputs a first gate signal to the first gate line GL1 connected to a first main pixel MP1 and the second gate line GL2 connected to a second main pixel MP2 in response to a first pulse of the first clock pulse CPV1. When the seventeenth flip-flop DF17 outputs the first gate signal, the seventeenth flip-flop DF17 outputs a seventeenth carry signal C17 to the twenty-first flip-flop DF21.

The nineteenth flip-flop DF19 receives the first gate start signal STV1 and outputs a second gate signal to the third gate line GL3 connected to a third main pixel MP3 and the fourth gate line GL4 connected to a fourth main pixel MP4 in response to a first pulse of the second clock pulse CPV2. When the nineteenth flip-flop DF19 outputs the second gate signal, the nineteenth flip-flop DF19 outputs a nineteenth carry signal C19 to the twenty-third flip-flop DF23.

The twenty-first flip-flop DF21 receives the seventeenth carry signal C17 from the seventeenth flip-flop DF17 and outputs a third gate signal to the fifth gate line GL5 connected to a fifth main pixel MP5 and the sixth gate line GL6 connected to a sixth main pixel MP6 in response to the seventeenth carry signal C17 and a second pulse of the first clock pulse CPV1. When the twenty-first flip-flop DF21 outputs the third gate signal, the twenty-first flip-flop DF21 outputs a twenty-first carry signal C21 to a first flip-flop of the dummy gate lines driving circuit part DGIC2 disposed next to the gate lines driving circuit part GIC20.

The twenty-third flip-flop DF23 receives the nineteenth carry signal C19 from the nineteenth flip-flop DF19 and outputs a fourth gate signal to the seventh gate line GL7 connected to a seventh main pixel MP7 and the eighth gate line GL8 connected to an eighth main pixel MP8 in response to the nineteenth carry signal C19 and a second pulse of the second clock pulse CPV2. When the twenty-third flip-flop DF23 outputs the fourth gate signal, the twenty-third flip-flop DF23 outputs a twenty-third carry signal C23 to a third flip-flop of the dummy gate lines driving circuit part DGIC2 disposed next to the gate lines driving circuit part GIC20.

Hereinafter, the sequence of which the gate lines driving circuit part GIC20 applies the charge sharing signals to the charge sharing lines CS1, CS2, . . . , CS8 is described.

In the normal-mounting mode, the eighteenth flip-flop DF18 receives the second gate start signal STV2 and outputs a first charge sharing signal to the first charge sharing line CS1 connected to a first sub pixel SP1 and the second charge sharing line CS2 connected to a second sub pixel SP2 in response to a first pulse of the third clock pulse CPV3. When the eighteenth flip-flop DF18 outputs the first charge sharing signal, the eighteenth flip-flop DF18 outputs an eighteenth carry signal C18 to the twenty-second flip-flop DF22.

The twentieth flip-flop DF20 receives the second gate start signal STV2 and outputs a second charge sharing signal to the third charge sharing line CS3 connected to a third sub pixel SP3 and the fourth charge sharing line CS4 connected to a fourth sub pixel SP4 in response to a first pulse of the fourth clock pulse CPV4. When the twentieth flip-flop DF20 outputs the second charge sharing signal, the twentieth flip-flop DF20 outputs a twentieth carry signal C20 to the twenty-fourth flip-flop DF24.

The twenty-second flip-flop DF22 receives the eighteenth carry signal C18 from the eighteenth flip-flop DF18 and outputs a third charge sharing signal to the fifth charge sharing line CS5 connected to a fifth sub pixel SP5 and the sixth charge sharing line CS6 connected to a sixth sub pixel SP6 in response to the eighteenth carry signal C18 and a second pulse of the third clock pulse CPV3. When the twenty-second flip-flop DF22 outputs the third charge sharing signal, the twenty-second flip-flop DF22 outputs a twenty-second carry signal C22 to a second flip-flop of the dummy gate lines driving circuit part DGIC2 disposed next to the gate lines driving circuit part GIC20.

The twenty-fourth flip-flop DF24 receives the twentieth carry signal C20 from the twentieth flip-flop DF20 and outputs a fourth charge sharing signal to the seventh charge sharing line CS7 connected to a seventh sub pixel SP7 and the eighth charge sharing line CS8 connected to an eighth sub pixel SP8 in response to the twentieth carry signal C20 and a second pulse of the fourth clock pulse CPV4. When the twenty-fourth flip-flop DF24 outputs the fourth charge sharing signal, the twenty-fourth flip-flop DF24 outputs a twenty-fourth carry signal C24 to a fourth flip-flop of the dummy gate lines driving circuit part DGIC2 disposed next to the gate lines driving circuit part GIC20.

In the normal-mounting mode, the dummy gate lines driving circuit part DGIC2 is driven after the gate lines driving circuit part GIC20 is driven.

Referring to FIGS. 20 and 23, the dummy gate lines driving circuit part DGIC2 according to the present embodiment includes a twenty-fifth flip-flop DF25, a twenty-sixth flip-flop DF26, a twenty-seventh flip-flop DF27, a twenty-eighth flip-flop DF28, a twenty-ninth flip-flop DF29, a thirtieth flip-flop DF30, a thirty-first flip-flop DF31 and a thirty-second flip-flop DF32.

For convenience of description, the dummy gate lines driving circuit part DGIC2 in FIG. 23 includes eight flip-flops, but the dummy gate lines driving circuit part DGIC2 may include a different number of plural flip-flops depending on the numbers of dummy gate lines and dummy charge sharing lines connected to the dummy gate lines driving circuit part DGIC2.

In the normal-mounting mode, the first clock pulse CPV1 is applied to the first clock pulse line CPL1, the second clock pulse CPV2 is applied to the second clock pulse line CPL2, the third clock pulse CPV3 is applied to the third clock pulse line CPL3, and the fourth clock pulse CPV4 is applied to the fourth clock pulse line CPL4.

In the normal-mounting mode, the twenty-fifth flip-flop DF25 receives the twenty-first carry signal C21 from the twenty-first flip-flop DF21 in FIG. 22 and outputs a first dummy gate signal to a first and second dummy gate lines DGL1 and DGL2 in response to the twenty-first carry signal C21 and a third pulse of the first clock pulse CPV1. When the twenty-fifth flip-flop DF25 outputs the first dummy gate signal, the twenty-fifth flip-flop DF25 outputs a twenty-fifth carry signal C25 to the twenty-ninth flip-flop DF29.

In the same manner like the twenty-fifth flip-flop DF25, the twenty-seventh flip-flop DF27, the twenty-ninth flip-flop DF29 and the thirty-first flip-flop DF31 output second, third and fourth dummy gate signals to a third dummy gate line DGL3, a fourth dummy gate line DGL4, . . . , an eighth dummy gate line DGL8.

The twenty-sixth flip-flop DF26 receives the twenty-second carry signal C22 from the twenty-second flip-flop DF22 in FIG. 22 and outputs a first dummy charge sharing signal to first and second dummy charge sharing lines DCS1 and DCS2 in response to the twenty-second carry signal C22 and a third pulse of the third clock pulse CPV3. When the twenty-sixth flip-flop DF26 outputs the first dummy charge sharing signal, the twenty-sixth flip-flop DF26 outputs a twenty-sixth carry signal C26 to the thirtieth flip-flop DF30.

In the same manner like the twenty-sixth flip-flop DF26, the twenty-eighth flip-flop DF28, the thirtieth flip-flop DF30 and the thirty-second flip-flop DF32 output second, third and fourth dummy charge sharing signals to a third dummy charge sharing line DCS3, a fourth dummy charge sharing line DCS4, . . . , an eighth dummy charge sharing line DCS8.

Operations of the twenty-seventh to thirty-second flip-flops DF27, DF28, DF29, DF30, DF31 and DF32 are substantially the same as the operations of the nineteenth to twenty-fourth flip-flops DF19, DF20, DF21, DF22, DF23 and DF24 described with reference to FIG. 22 respectively, and thus further repetitive detailed explanation concerning the twenty-seventh to thirty-second flip-flops DF27, DF28, DF29, DF30, DF31 and DF32 will be omitted.

In the normal-mounting mode, the dummy gate lines driving circuit part DGIC2 is driven after the gate lines driving circuit part GIC20 is driven, but in the inverted-mounting mode, the gate lines driving circuit part GIC20 is driven after the dummy gate lines driving circuit part DGIC2 is driven.

Referring now to FIGS. 21 and 24, in the inverted-mounting mode, the second clock pulse CPV2 is applied to the first clock pulse line CPL1, the first clock pulse CPV1 is applied to the second clock pulse line CPL2, the fourth clock pulse CPV4 is applied to the third clock pulse line CPL3, and the third clock pulse CPV3 is applied to the fourth clock pulse line CPL4.

In the inverted-mounting mode, a sequence of which the dummy gate lines driving circuit part DGIC2 applies the dummy gate signals to the dummy gate lines DGL1, DGL2, . . . , DGL8 is described, and then a sequence of which the dummy gate lines driving circuit part DGIC2 applies the dummy charge sharing signals to the dummy charge sharing lines DCS1, DCS2, . . . , DCS8 is described.

In the inverted-mounting mode, the thirty-first flip-flop DF31 receives the first gate start signal STV1 and outputs the fourth dummy gate signal to the eighth and seventh dummy gate lines DGL8 and DGL7 in response to a first pulse of the first clock pulse CPV1. When the thirty-first flip-flop DF31 outputs the fourth dummy gate signal, the thirty-first flip-flop DF31 outputs a thirty-first carry signal C31 to the twenty-seventh flip-flop DF27.

The twenty-ninth flip-flop DF29 receives the first gate start signal STV1 and outputs the third dummy gate signal to the sixth and fifth dummy gate lines DGL6 and DGL5 in response to a first pulse of the second clock pulse CPV2. When the twenty-ninth flip-flop DF29 outputs the third dummy gate signal, the twenty-ninth flip-flop DF29 outputs a twenty-ninth carry signal C29 to the twenty-fifth flip-flop DF25.

The twenty-seventh flip-flop DF27 receives the thirty-first carry signal C31 from the thirty-first flip-flop DF31 and outputs the second dummy gate signal to the fourth and third dummy gate lines DGL4 and DGL3 in response to the thirty-first carry signal C31 and a second pulse of the first clock pulse CPV1. When the twenty-seventh flip-flop DF27 outputs the second dummy gate signal, the twenty-seventh flip-flop DF27 outputs a twenty-seventh carry signal C27 to the twenty-third flip-flop DF23 which is a seventh flip-flop of the gate lines driving circuit part GIC20.

The twenty-fifth flip-flop DF25 receives the twenty-ninth carry signal C29 from the twenty-ninth flip-flop DF29 and outputs the first dummy gate signal to the second and first dummy gate lines DGL2 and DGL1 in response to the twenty-ninth carry signal C29 and a second pulse of the second clock pulse CPV2. When the twenty-fifth flip-flop DF25 outputs the first dummy gate signal, the twenty-fifth flip-flop DF25 outputs a twenty-fifth carry signal C25 to the twenty-first flip-flop DF21 which is a fifth flip-flop of the gate lines driving circuit part GIC20.

Hereinafter, the sequence of which the dummy gate lines driving circuit part DGIC2 applies the dummy charge sharing signals to the dummy charge sharing lines DCS1, DCS2, . . . , DCS8 is described.

In the inverted-mounting mode, the thirty-second flip-flop DF32 receives the second gate start signal STV2 and outputs the fourth dummy charge sharing signal to the eighth and seventh dummy charge sharing lines DCS8 and DCS7 in response to a first pulse of the third clock pulse CPV3. When the thirty-second flip-flop DF32 outputs the fourth dummy charge sharing signal, the thirty-second flip-flop DF32 outputs a thirty-second carry signal C32 to the twenty-eighth flip-flop DF28.

The thirtieth flip-flop DF30 receives the second gate start signal STV2 and outputs the third dummy charge sharing signal to the sixth and fifth dummy charge sharing lines DCS6 and DCS5 in response to a first pulse of the fourth clock pulse CPV4. When the thirtieth flip-flop DF30 outputs the third dummy charge sharing signal, the thirtieth flip-flop DF30 outputs a thirtieth carry signal C30 to the twenty-sixth flip-flop DF26.

The twenty-eighth flip-flop DF28 receives the thirty-second carry signal C32 from the thirty-second flip-flop DF32 and outputs the second dummy charge sharing signal to the fourth and third dummy charge sharing lines DCS4 and DCS3 in response to the thirty-second carry signal C32 and a second pulse of the third clock pulse CPV3. When the twenty-eighth flip-flop DF28 outputs the second dummy charge sharing signal, the twenty-eighth flip-flop DF28 outputs a twenty-eighth carry signal C28 to the twenty-fourth flip-flop DF24 which is an eighth flip-flop of the gate lines driving circuit part GIC20.

The twenty-sixth flip-flop DF26 receives the thirtieth carry signal C30 from the thirtieth flip-flop DF30 and outputs the first dummy charge sharing signal to the second and first dummy charge sharing lines DCS2 and DCS1 in response to the thirtieth carry signal C30 and a second pulse of the fourth clock pulse CPV4. When the twenty-sixth flip-flop DF26 outputs the first dummy charge sharing signal, the twenty-sixth flip-flop DF26 outputs a twenty-sixth carry signal C26 to the twenty-second flip-flop DF22 which is a sixth flip-flop of the gate lines driving circuit part GIC20.

Referring to FIGS. 21 and 25, in the inverted-mounting mode, the second clock pulse CPV2 is applied to the first clock pulse line CPL1, the first clock pulse CPV1 is applied to the second clock pulse line CPL2, the fourth clock pulse CPV4 is applied to the third clock pulse line CPL3, and the third clock pulse CPV3 is applied to the fourth clock pulse line CPL4.

In the inverted-mounting mode, the twenty-third flip-flop DF23 receives the twenty-seventh carry signal C27 from the twenty-seventh flip-flop DF27 of the dummy gate lines driving circuit part DGIC2 and outputs the fourth gate signal to the eighth gate line GL8 connected to the eighth main pixel MP8 and the seventh gate line GL7 connected to the seventh main pixel MP7 in response to the twenty-seventh carry signal C27 and a third pulse of the first clock pulse CPV1. When the twenty-third flip-flop DF23 outputs the fourth gate signal, the twenty-third flip-flop DF23 outputs a twenty-third carry signal C23 to the nineteenth flip-flop DF19.

In the same manner like the twenty-third flip-flop DF23, the twenty-first flip-flop DF21, the nineteenth flip-flop DF19 and the seventeenth flip-flop DF17 output the third, second and first gate signals to the sixth gate line GL6, the fifth gate line GL5, . . . , the first gate line GL1.

The twenty-fourth flip-flop DF24 receives the twenty-eighth carry signal C28 from the twenty-eighth flip-flop DF28 of the dummy gate lines driving circuit part DGIC2 and outputs the fourth charge sharing signal to the eighth charge sharing line CS8 connected to the eighth sub pixel SP8 and the seventh charge sharing line CS7 connected to the seventh sub pixel SP7 in response to the twenty-eighth carry signal C28 and a third pulse of the third clock pulse CPV3. When the twenty-fourth flip-flop DF24 outputs the fourth charge sharing signal, the twenty-fourth flip-flop DF24 outputs a twenty-fourth carry signal C24 to the twentieth flip-flop DF20.

In the same manner like the twenty-fourth flip-flop DF24, the twenty-second flip-flop DF22, the twentieth flip-flop DF20 and the eighteenth flip-flop DF18 output the third, second and first charge sharing signals to the sixth charge sharing line CS6, the fifth charge sharing line CS5, . . . , the first charge sharing line CS1.

Operations of the seventeenth to twenty-second flip-flops DF17, DF18, DF19, DF20, DF21 and DF22 are substantially the same as the operations of the twenty-fifth to thirteenth flip-flops DF25, DF26, DF27, DF28, DF29 and DF30 described with reference to FIG. 24 respectively, and thus further repetitive detailed explanation concerning the seventeenth through twenty-second flip-flops DF17, DF18, DF19, DF20, DF21 and DF22 will be omitted.

Figure 27:
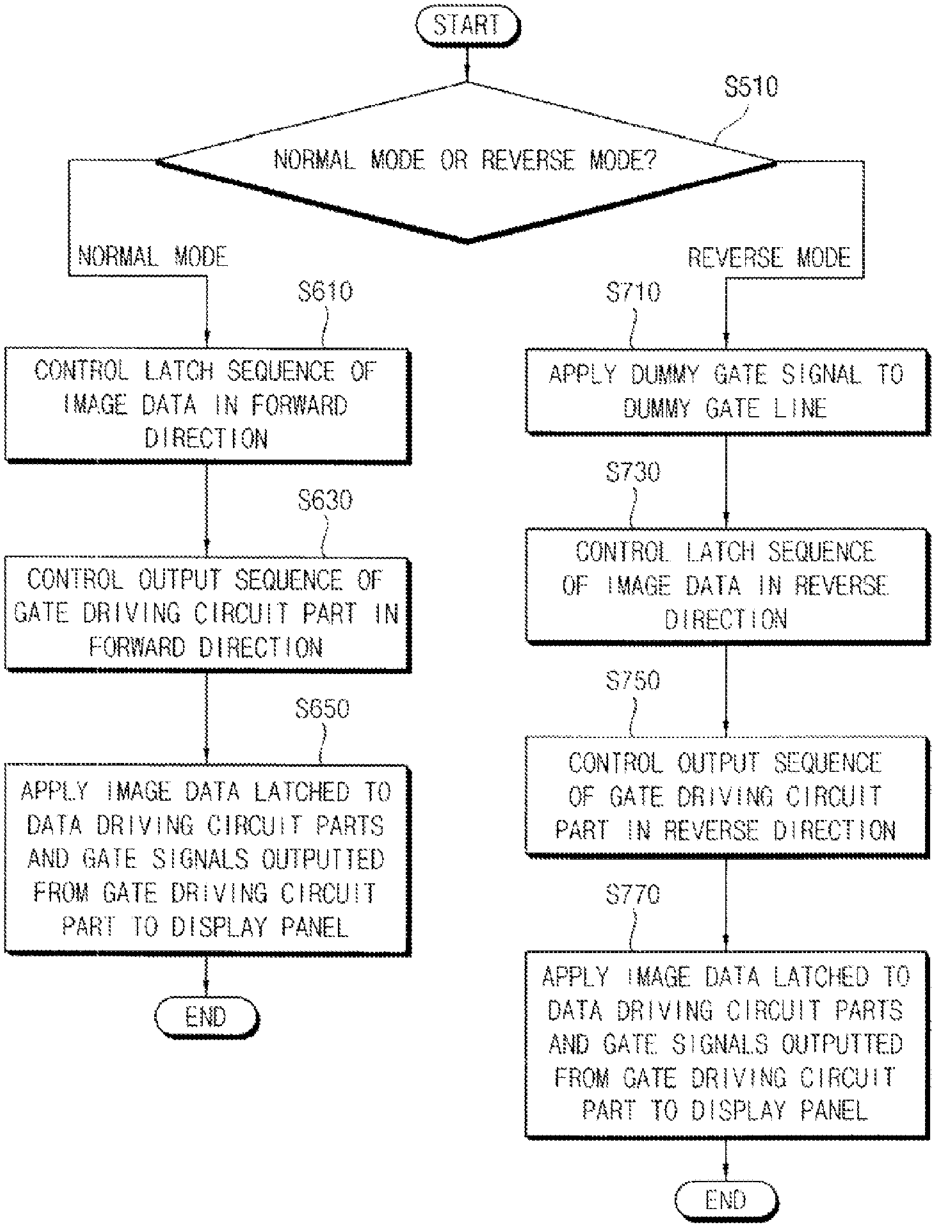
FIG. 27 is a flowchart illustrating a method of driving the display panel in FIG. 7.

FIG. 27 is a flowchart illustrating a method of driving the display panel in FIG. 7 where behavior depends on which of normal-mounting mode or the inverted-mounting mode is indicated.

Referring to FIGS. 7 to 27, the timing control part 570 determines whether the mode is the normal-mounting mode or the inverted-mounting mode depending on the selection signal SEL applied to the timing control part 570 from the outside of the display apparatus 500 (step S510).

In the normal-mounting mode, a normal image may be displayed on the display panel 510, and in the inverted-mounting mode, an image reversed in up, down, left and right directions in comparison with the normal image may be displayed on the display panel 510.

When the timing control part 570 determines the mode as normal, the timing control part 570 controls the latch sequence of the image data DATA in the forward direction (step S610). Thus, the timing control part 570 controls the data lines driving part 550 so that the data lines driving part 550 sequentially latches the image data DATA to the data lines driving circuit parts DIC1, DIC2, . . . , DICm from the first data lines driving circuit part DIC1, the second data lines driving circuit part DIC2, . . . , the m-th data lines driving circuit part DICm.

The timing control part 570 controls the output sequence of the gate lines driving circuit parts GIC1, GIC2, . . . , GICn in the gate lines driving part 530 in the forward direction (step S630). Thus, the timing control part 570 controls the gate lines driving part 530 so that the gate lines driving part 530 sequentially outputs the gate signals in a sequence of the first gate lines driving circuit part GIC1, the second gate lines driving circuit part GIC2, . . . , the n-th gate lines driving circuit part GICn.

The data lines driving part 550 applies the image data DATA latched to the data lines driving circuit parts DIC1, DIC2, . . . , DICm to the display panel 510, and the gate lines driving part 530 applies the gate signals outputted from the gate lines driving circuit parts GIC1, GIC2, . . . , GICn to the display panel 510 (step S650).

When the timing control part 570 determines the mode as being reverse, the timing control part 570 controls the gate lines driving part 530 so that the gate lines driving part 530 applies the dummy gate signals to the dummy gate lines DGL1, DGL2, . . . , DGLn before the gate lines driving circuit parts GIC1, GIC2, . . . , GICn are driven.

The timing control part 570 controls the latch sequence of the image data DATA in the reverse direction (step S730). Thus, the timing control part 570 controls the data lines driving part 550 so that the data lines driving part 550 sequentially latches the image data DATA to the data lines driving circuit parts DIC1, DIC2, . . . , DICm from the m-th data lines driving circuit part DICm to the first data lines driving circuit part DIC1.

The timing control part 570 controls the output sequence of the gate lines driving circuit parts GIC1, GIC2, . . . , GICn in the gate lines driving part 530 in the reverse direction (step S750). Thus, the timing control part 570 controls the gate lines driving part 530 so that the gate lines driving part 530 sequentially outputs the gate signals from the n-th gate lines driving circuit part GICn to the first gate lines driving circuit part GIC1 in the recited order.

The data lines driving part 550 applies the image data DATA latched to the data lines driving circuit parts DIC1, DIC2, . . . , DICm to the display panel 510, and the gate lines driving part 530 applies the gate signals outputted from the gate lines driving circuit parts GIC1, GIC2, . . . , GICn to the display panel 510 (step S770).

Therefore, in the inverted-mounting mode, the timing control part 570 controls the latch sequence of the image data DATA that is latched to the data lines driving circuit parts DIC1, DIC2, . . . , DICm in the reverse direction that is reverse to the forward direction in the normal-mounting mode and controls the output sequence of the gate lines driving circuit parts GIC1, GIC2, . . . , GICn in the reverse direction, and thus the image reversed in up, down, left and right directions in comparison with the normal image of the normal-mounting mode is displayed on the display panel 510.

Figure 28:
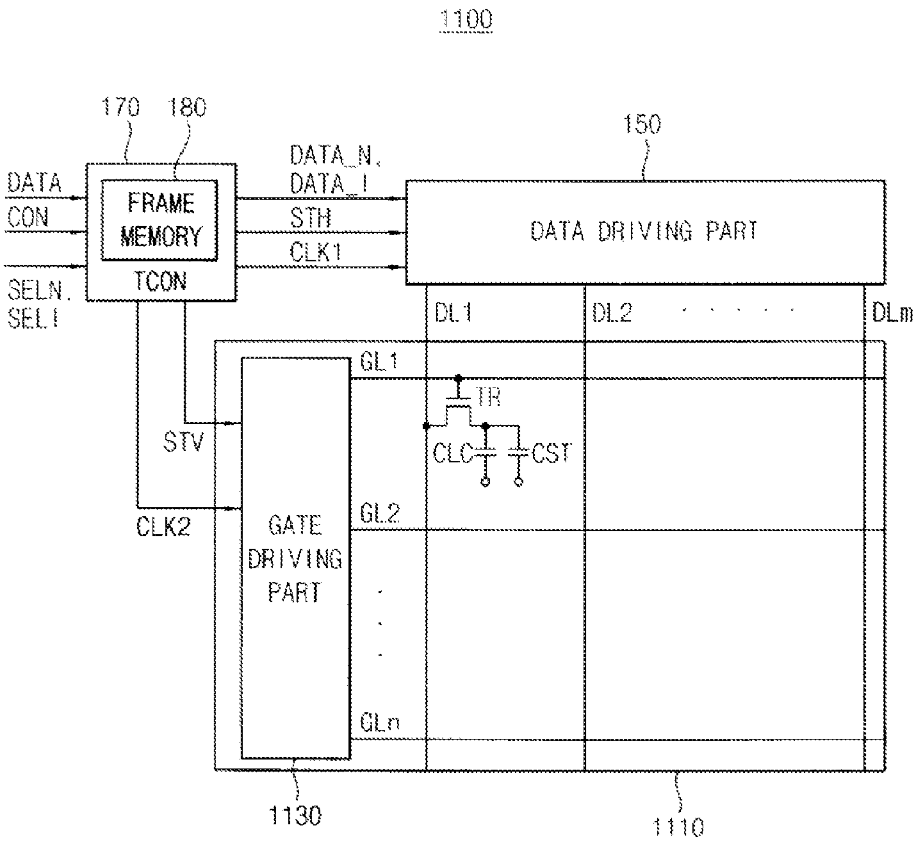
FIG. 28 is a block diagram illustrating a display apparatus according to still another example embodiment of the present invention.

FIG. 28 is a block diagram illustrating yet another display apparatus according to embodiment in accordance with the present disclosure.

The display apparatus according to the present example embodiment is substantially the same as the display apparatus according to the previous example embodiment in FIG. 1 except for a display panel 1110 and a gate lines driving part 1130. Thus, the same reference numerals will be used to refer to the same or like parts as those described in the previous example embodiment and any further repetitive explanation concerning the above elements will be omitted.

Referring to FIG. 28, the display apparatus 1100 according to the present example embodiment includes the display panel 1110, the data lines driving part 150 and the timing control part 170, and the display panel 1110 includes the gate lines driving part 1130.

The gate lines driving part 1130 may include an amorphous silicon gate (ASG) circuitry integrally disposed on an array substrate of the display panel 1110 and may include a plurality of gate lines driving circuit parts connected in a cascade form corresponding to the gate lines GL1, GL2, . . . , GLn.

A driving of the gate lines driving part 1130 according to the present example embodiment is substantially the same as the driving of the gate lines driving part 130 in FIG. 1, and thus the gate lines driving part 1130 generates the gate signals in response to the gate start signal STV and the second clock signal provided from the timing control part 170 and outputs the gate signals to the gate lines GL1, G2, . . . , GLn.

Figure 29:
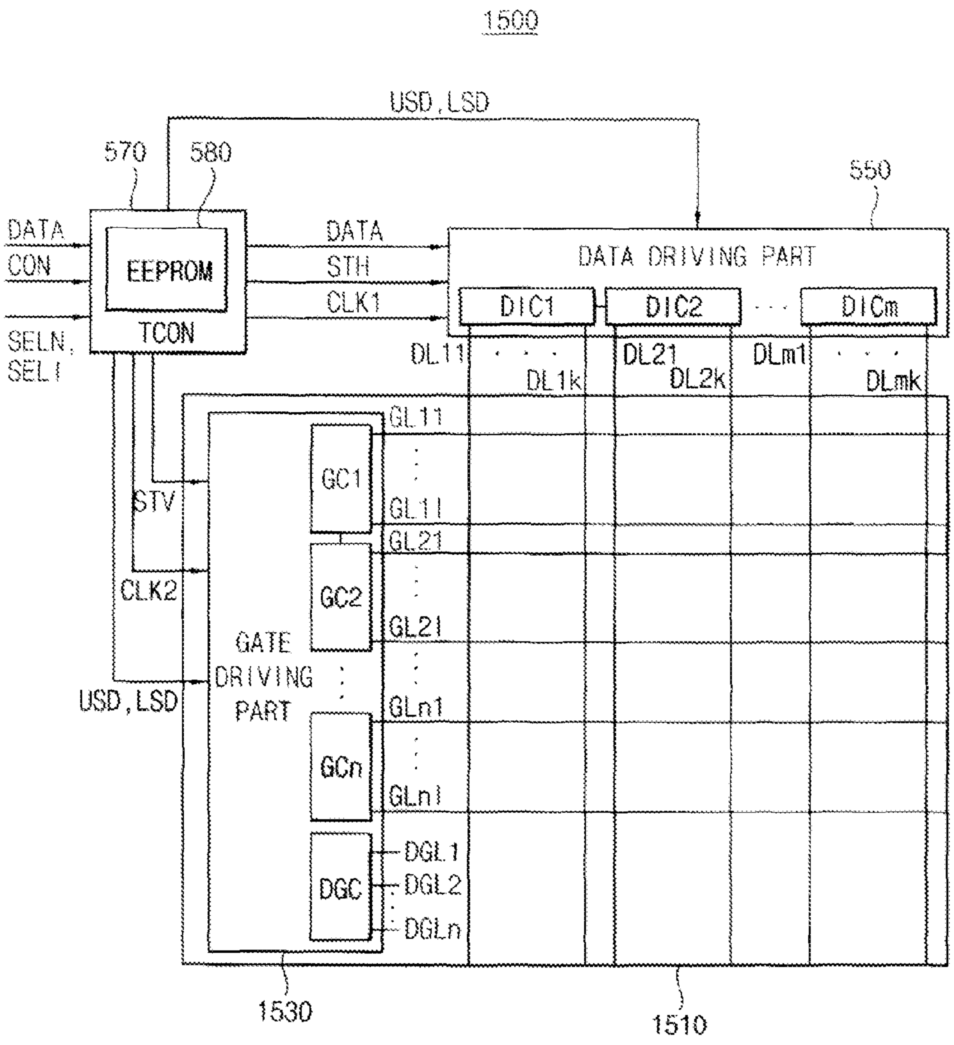
FIG. 29 is a block diagram illustrating a display apparatus according to still another example embodiment of the present invention.

FIG. 29 is a block diagram illustrating a display apparatus according to still another example embodiment of the present teachings.

The display apparatus according to the present example embodiment is substantially the same as the display apparatus according to the previous example embodiment in FIG. 7 except for a display panel 1510 and a gate lines driving part 1530. Thus, the same reference numerals will be used to refer to the same or like parts as those described in the previous example embodiment and any further repetitive explanation concerning the above elements will be omitted.

Referring to FIG. 29, the display apparatus 1500 according to the present example embodiment includes the display panel 1510, the data lines driving part 550 and the timing control part 570, and the display panel 1510 includes the gate lines driving part 1530.

The gate lines driving part 1530 may include an ASG circuit integrally disposed on an array substrate of the display panel 1510 and may include a plurality of gate lines driving circuit parts GC1, GC2, . . . , GCn connected to the gate lines GL11, . . . , GL11, GL21, . . . , GL21, . . . , GLn1, . . . , GLn1 and connected in a cascade form.

A driving of the gate lines driving part 1530 according to the present example embodiment is substantially same as the driving of the gate lines driving part 530 in FIG. 7, and thus the gate lines driving part 1530 generates the gate signals in response to the gate start signal STV, the second clock signal, the normal-mounting mode signal USD and the inverted-mounting mode signal LSD provided from the timing control part 570 and outputs the gate signals to the gate lines GL11, . . . , GL11, GL21, . . . , GL21, . . . , GLn1, . . . , GLn1.

According to the method of driving the display panel and the display apparatus for performing the same of the present invention, previous data and present data are read in the reverse direction after the previous data and the present data are written in the forward direction, and thus the DCC data may be generated and the image reversed in up, down, left and right directions of a lower side driving method may be displayed. In addition, according to the method of driving the display panel and the display apparatus for performing the same of the present invention, the timing control part controls the latch sequence of the image data that is latched to the data lines driving circuit parts and the output sequence of the gate lines driving circuit parts, and thus the image reversed in up, down, left and right directions of a lower side driving method may be displayed. Therefore, the method of driving the display panel and the display apparatus for performing the same of the present invention may decrease heat generated by the display apparatus by shortening a line transferring a gate start signal, and thus image quality may be improved.

The foregoing is illustrative of the present teachings and is not to be construed as limiting thereof. Although a few example embodiments have been described, those skilled in the art will readily appreciate from the foregoing that many modifications are possible in the example embodiments without materially departing from the novel teachings and advantages disclosed herein. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present teachings and is not to be construed as limited to the specific example embodiments disclosed, and that modifications to the disclosed example embodiments, as well as other example embodiments, are intended to be included within the scope of the present disclosure.

What is claimed is:

1. A method of driving a display panel, the method comprising:

controlling a latch sequence of image data and an output sequence of gate lines driving circuit parts in a forward direction in response to a normal-mounting mode selection signal for displaying a normal mounted image as a full frame on a display panel, the image data being latched to data lines driving circuit parts, the display panel including a plurality of gate lines and a plurality of data lines;

applying the latched image data and gate signals outputted from the gate lines driving circuit parts to the display panel;

applying a dummy gate signal to at least one dummy gate line adjacent to a last gate line of the gate lines, in response to an inverted-mounting mode selection signal for displaying an inverted mount image as a full frame on the display panel;

controlling the latch sequence of the image data and the output sequence of the gate lines driving circuit parts in a reverse direction; and applying the latched image data and the gate signals outputted from the gate lines driving circuit parts to the display panel, wherein the dummy gate signal is applied during an asynchronous period between serial signal streams of first and second frame rate control chips controlling a frame of the image data.

2. The method of claim 1, wherein controlling the latch sequence of the image data and the output sequence of the gate lines driving circuit parts in the forward direction comprises:

controlling the data lines driving circuit parts so that the data lines driving circuit parts sequentially latch the image data from a first data lines driving circuit part to a last data lines driving circuit part; and controlling the data lines driving circuit parts so that the data lines driving circuit parts sequentially output the image data to a plurality of data channels from the image data applied to a first data channel to the image data applied to a last data channel, the data channels being respectively connected to the data lines driving circuit parts.

3. The method of claim 1, wherein controlling the latch sequence of the image data and the output sequence of the gate lines driving circuit parts in the reverse direction comprises:

controlling the data lines driving circuit parts so that the data lines driving circuit parts sequentially latch the image data from a last data lines driving circuit part to a first data lines driving circuit part in the recited order; and controlling the data lines driving circuit parts so that the data lines driving circuit parts sequentially output the image data to a plurality of data channels from the image data applied to a last data channel to the image data applied to a first data channel, the data channels being respectively connected to the data lines driving circuit parts.

4. The method of claim 3, wherein controlling the latch sequence of the image data and the output sequence of the gate lines driving circuit parts in the reverse direction further comprises:

switching an output sequence of the image data applied to odd-numbered data channels of the data channels and an output sequence of the image data applied to even-numbered data channels of the data channels, when a two-port mode using a first port applying the image data to the odd-numbered data channels and a second port applying the image data to the even-numbered data channels is indicated to be used.

5. The method of claim 1, wherein controlling the latch sequence of the image data and the output sequence of the gate lines driving circuit parts in the forward direction comprises:

controlling the gate lines driving circuit parts so that the gate lines driving circuit parts sequentially output gate signals from a first gate lines driving circuit part to a last gate lines driving circuit part; and controlling the gate lines driving circuit parts so that the gate lines driving circuit parts sequentially output the gate signals to a plurality of gate channels from a first gate channel to a last gate channel, the gate channels being respectively connected to the gate lines driving circuit parts.

6. The method of claim 5, wherein controlling the gate lines driving circuit parts so that the gate lines driving circuit parts sequentially output the gate signals to the gate channels from the first gate channel to the last gate channel comprises:

applying a gate start signal to the first gate lines driving circuit part so that the gate lines driving circuit parts are sequentially activated from the first gate lines driving circuit part to the last gate lines driving circuit part in the recited order.

7. The method of claim 5, wherein controlling the gate lines driving circuit parts so that the gate lines driving circuit parts sequentially output the gate signals to the gate channels from the first gate channel to the last gate channel comprises:

sequentially activating flip-flops from a first flip-flop connected to the first gate channel to a last flip-flop connected to the last gate channel.

8. The method of claim 1, wherein controlling the latch sequence of the image data and the output sequence of the gate lines driving circuit parts in the reverse direction comprises:

controlling the gate lines driving circuit parts so that the gate lines driving circuit parts sequentially output gate signals from a last gate lines driving circuit part to a first gate lines driving circuit part in the recited order; and controlling the gate lines driving circuit parts so that the gate lines driving circuit parts sequentially output the gate signals to a plurality of gate channels from a last gate channel to a first gate channel, the gate channels being respectively connected to the gate lines driving circuit parts.

9. The method of claim 8, wherein controlling the gate lines driving circuit parts so that the gate lines driving circuit parts sequentially output gate signals from the last gate lines driving circuit part to the first gate lines driving circuit part comprises:

transferring a gate start signal to the last gate lines driving circuit part through the first gate lines driving circuit part so that the gate lines driving circuit parts are sequentially activated from the last gate lines driving circuit part to the first gate lines driving circuit part in the recited order.

10. The method of claim 8, wherein controlling the gate lines driving circuit parts so that the gate lines driving circuit parts sequentially output the gate signals to the gate channels from the last gate channel to the first gate channel comprises:

sequentially activating flip-flops from a last flip-flop connected to the last gate channel to a first flip-flop connected to the first gate channel.

11. A display apparatus comprising:

a display panel including a plurality of gate lines and a plurality of data lines;

a plurality of gate lines driving circuit parts outputting gate signals to the gate lines;

a plurality of data lines driving circuit parts outputting data signals to the data lines; and a timing control part applying a dummy gate signal to at least one dummy gate line adjacent to a last gate line of the gate lines and controlling a latch sequence of image data and an output sequence of the gate lines driving circuit parts in a reverse sequence, in response to an inverted-mounting mode selection signal for displaying a full frame of an inverted mount reversed image on the display panel, the image data being latched to the data lines driving circuit parts, wherein the timing control part applies the dummy gate signal to the dummy gate line during an asynchronous period between serial streams of first and second frame rate control chips controlling a frame of the image data.

* * * * *